(12) United States Patent
Shalaby

(10) Patent No.: US 12,332,058 B1
(45) Date of Patent: Jun. 17, 2025

(54) COMPACT FIBER OPTIC GYROSCOPE WITH FEEDBACK-ENHANCED FREQUENCY INTERFEROMETRY FOR PRECISION MEASUREMENT

(71) Applicant: IMAM MOHAMMAD IBN SAUD ISLAMIC UNIVERSITY, Riyadh (SA)

(72) Inventor: Mohamed Yehia Mohamed Shalaby, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/035,744

(22) Filed: Jan. 23, 2025

(51) Int. Cl.
```
G01C 19/72    (2006.01)
G01C 19/64    (2006.01)
G01C 19/66    (2006.01)
```
(52) U.S. Cl.
CPC ........... *G01C 19/722* (2013.01); *G01C 19/64* (2013.01); *G01C 19/668* (2013.01); *G01C 19/72* (2013.01)

(58) Field of Classification Search
CPC .... G01C 19/722; G01C 19/64; G01C 19/668; G01C 19/72
See application file for complete search history.

(56) References Cited

U.S. PATENT DOCUMENTS

| | | | |
|---|---|---|---|
| 5,321,503 A | 6/1994 | Bramson | |
| 5,398,111 A * | 3/1995 | Cardarelli | G01C 19/727 372/6 |
| 5,898,496 A * | 4/1999 | Huang | G01C 19/726 356/464 |
| 7,227,644 B2 * | 6/2007 | Anson | G01C 19/721 385/12 |
| 2005/0191008 A1 * | 9/2005 | Anson | G01C 19/721 385/39 |
| 2012/0307252 A1 | 12/2012 | Moores et al. | |

(Continued)

FOREIGN PATENT DOCUMENTS

CN          113932789 A          1/2022

OTHER PUBLICATIONS

Caterina Ciminelli, et al., "Photonic technologies for angular velocity sensing", Advances in Optics and Photonics, vol. 2, Issue 3, Jun. 2, 2010, pp. 370-404.

*Primary Examiner* — Jonathan M Hansen
(74) *Attorney, Agent, or Firm* — Oblon, McClelland, Maier & Neustadt, L.L.P.

(57) ABSTRACT

Methods and systems for measuring low speed angular rotation of a fiber optic gyroscope. A beam of light waves is split into a first path and a second path. The light waves of the second path are directed through a fiber circulator and split into a third and a fourth path. The third path and fourth path are coupled into opposite ends of an optical fiber coil to circulate clockwise and counterclockwise. Rotation of the fiber optic gyroscope generates a phase shift between the clockwise and counterclockwise light waves, which are recombined and fed back through the fiber circulator. The recombined waves are amplified, recirculated into the second path to increase the phase shift and transmitted along the first path to an optical spectrum analyzer which generates an interferogram. A microprocessor applies an FFT, measures the spacing of frequency components, and determines the angular rotation speed of the gyroscope.

20 Claims, 13 Drawing Sheets

(56) References Cited

U.S. PATENT DOCUMENTS

| | | | | |
|---|---|---|---|---|
| 2016/0363446 A1* | 12/2016 | Lefevre | ................ | G01C 19/727 |
| 2022/0260373 A1* | 8/2022 | Paniccia | ............... | G01C 19/727 |
| 2024/0167818 A1 | 5/2024 | Ducloux et al. | | |

* cited by examiner

COMPACT FIBER OPTIC GYROSCOPE WITH FEEDBACK-ENHANCED FREQUENCY INTERFEROMETRY FOR PRECISION MEASUREMENT

BACKGROUND

Technical Field

The present disclosure is directed to a compact fiber optic gyroscope with feedback-enhanced frequency interferometry for precision measurement.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Fiber optic gyroscopes are extensively used in navigation and aerospace systems for precise angular velocity measurements based on the Sagnac effect. This phenomenon occurs when a beam of light or electromagnetic wave is split into two paths traveling in opposite directions around a rotating loop. Upon recombination, the two beams exhibit a phase shift or interference pattern directly related to the rotation rate of the loop. Conventional fiber optic gyroscopes detect this phase shift in the time domain, offering solid-state performance with no moving parts, which enhances reliability and reduces maintenance.

Advancements in fiber optic technology, such as low-loss optical fibers and solid-state light sources, have significantly improved the performance and cost-effectiveness of fiber optic gyroscopes, enabling widespread adoption across military, aerospace, and industrial systems. Recent developments have focused on improving sensitivity, reducing noise, and minimizing drift, further enhancing accuracy and expanding the applications of fiber optic gyroscopes in platform stabilization, Light Detection and Ranging (LiDAR) systems, robotics, and automotive technologies. These innovations include the use of single-mode optical fibers, advanced signal processing techniques, and compact passive micro-optical gyroscopes, allowing for the development of high-performance, reliable systems.

U.S. Pat. No. 5,321,503A describes an interferometric fiber optic gyroscope that employs a fiber coil with an edge light-emitting diode (ELED) and a photodiode projecting light through a Mach-Zehnder interferometer. The system monitors the output signal using an optical spectrum analyzer. During motion, the phase shift between counter-propagating light beams in the fiber coil reflects angular velocity. However, the reliance on signal modulation to produce a square wave output for the receiving electronics introduces complexity and reduces reliability.

US20120307252A1 presents an interferometric fiber optic gyroscope that utilizes a pulsed light source generating light pulses traveling in clockwise and counterclockwise directions within a sensing coil. A detector measures the phase shift between the counter-propagating pulses to determine the rotation rate. While functional, the data processing approach is susceptible to errors, which can compromise accuracy.

CN113932789A outlines a method and system for data transmission in an optical fiber gyroscope with three fiber coils driven by a light source. Light is divided into three beams by a first coupler and further split by a second coupler. The polarized beams travel in opposite directions through a fiber ring, enabling angular rate sensing. A modulated voltage signal adjusts a Y waveguide to counter the external Sagnac phase shift in a digital closed-loop mode. Despite this innovation, the complexity of the system poses challenges.

Each of these references suffers from one or more limitations that hinder accurate measurement of extremely low rotational speeds, which is critical for applications that require high precision, such as navigation systems in aerospace and autonomous vehicles. Accordingly, it is one object of the present disclosure to provide a fiber optic gyroscope with feedback-enhanced frequency interferometry for precise measurement of extremely low speed angular rotation and direction of the rotation.

SUMMARY

In an exemplary embodiment, a fiber optic gyroscope system is described. The fiber optic gyroscope system includes a broadband light source configured to transmit light waves and a first 50/50 directional coupler connected at an input port to the broadband light source. The first 50/50 directional coupler is configured to split the light waves into a first path and a second path. The fiber optic gyroscope system further comprises a three port fiber circulator connected to the first 50/50 directional coupler. The three port fiber circulator is configured to receive the light waves of the second path at a first port and emit the light waves of the second path from a second port. The fiber optic gyroscope system includes a second 50/50 directional coupler connected to the second port of the three port fiber circulator, where the second 50/50 directional coupler is configured split the light waves of the second path into a third path and a fourth path, and an optical fiber coil connected to the second 50/50 directional coupler. The optical fiber coil includes a plurality of loops configured to receive the light waves from the third path and the fourth path, circulate the light waves from the third path in a clockwise direction through the plurality of loops and circulate the light waves from the fourth path in a counterclockwise direction through the plurality of loops. The light waves travelling in the counterclockwise direction are phase shifted with respect to the light waves travelling in the clockwise direction based on a rotational speed of the fiber optic gyroscope. The second 50/50 directional coupler is configured to recombine the light waves travelling in the clockwise direction and the light waves travelling in the counterclockwise direction and transmit a set of recombined phase shifted light waves to the second port of the three port fiber circulator. The three port fiber circulator is configured to emit the set of recombined phase shifted light waves from a third port. The third port is connected to a feedback port of the first 50/50 directional coupler.

The fiber optic gyroscope system further includes an optical spectrum analyzer connected to the first path of the first 50/50 directional coupler. The optical spectrum analyzer is configured to receive the set of recombined phase shifted light waves from the first path, apply frequency domain interferometry to the set of recombined phase shifted light waves and generate an interferogram of the set of recombined phase shifted light waves. The fiber optic gyroscope system also includes a microprocessor including a circuitry, a memory storing program instructions and at least one processor configured to execute the program instructions to perform a Fast Fourier Transform of the interferogram to transform the interferogram into a set of frequency components having repeated patterns, measure a spacing between two repeated patterns of frequency components, and determine, from the measured spacing, an angular speed of the fiber optic gyroscope.

In another exemplary embodiment, a method for measuring a low speed angular rotation of a fiber optic gyroscope. The method includes generating, with a broadband light source, a beam of light waves, and splitting, by a first 50/50 directional coupler, the beam of light waves into a first path and a second path. The method further includes transmitting, through a first port and a second port of a three port fiber circulator, the light waves of the second path to a second 50/50 directional coupler, and splitting, by the second 50/50 directional coupler, the light waves of the second path into a third path and a fourth path. The method includes coupling the light waves of the third path into a first port of an optical fiber coil configured with a plurality of loops. The light waves of the third path circulate in a clockwise direction within the plurality of loops.

The method further includes coupling the light waves of the fourth path into a second port of the optical fiber coil. The light waves of the fourth path circulate in a counterclockwise direction within the plurality of loops. The light waves circulate in the counterclockwise direction phase shift with respect to the light waves travelling in the clockwise direction based on a rotational speed of the fiber optic gyroscope when the fiber optic gyroscope is rotating. The method further includes recombining, by the second 50/50 directional couple, the light waves circulating in the clockwise direction and the light waves circulating in the counterclockwise direction and transmitting the recombined phase shifted light waves to the second port of the three port fiber circulator. The method further includes emitting, from a third port of the three port fiber circulator the recombined phase shifted light waves, and receiving, by a feedback port of the first 50/50 directional coupler, the recombined phase shifted light waves.

The method also includes receiving, by an optical spectrum analyzer, the recombined phase shifted light waves from the first path of the first 50/50 directional coupler, generating, by the optical spectrum analyzer, an interferogram of the recombined phase shifted light waves. The method includes receiving, by a microprocessor, the interferogram, and applying, by the microprocessor, a Fast Fourier Transform to the interferogram, where the Fast Fourier Transform is configured to transform the interferogram into a set of frequency components having repeated patterns. The method includes measuring, by the microprocessor, a spacing between two repeated patterns of frequency components, and determining, from the measured spacing, a speed of an angular rotation of the fiber optic gyroscope.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
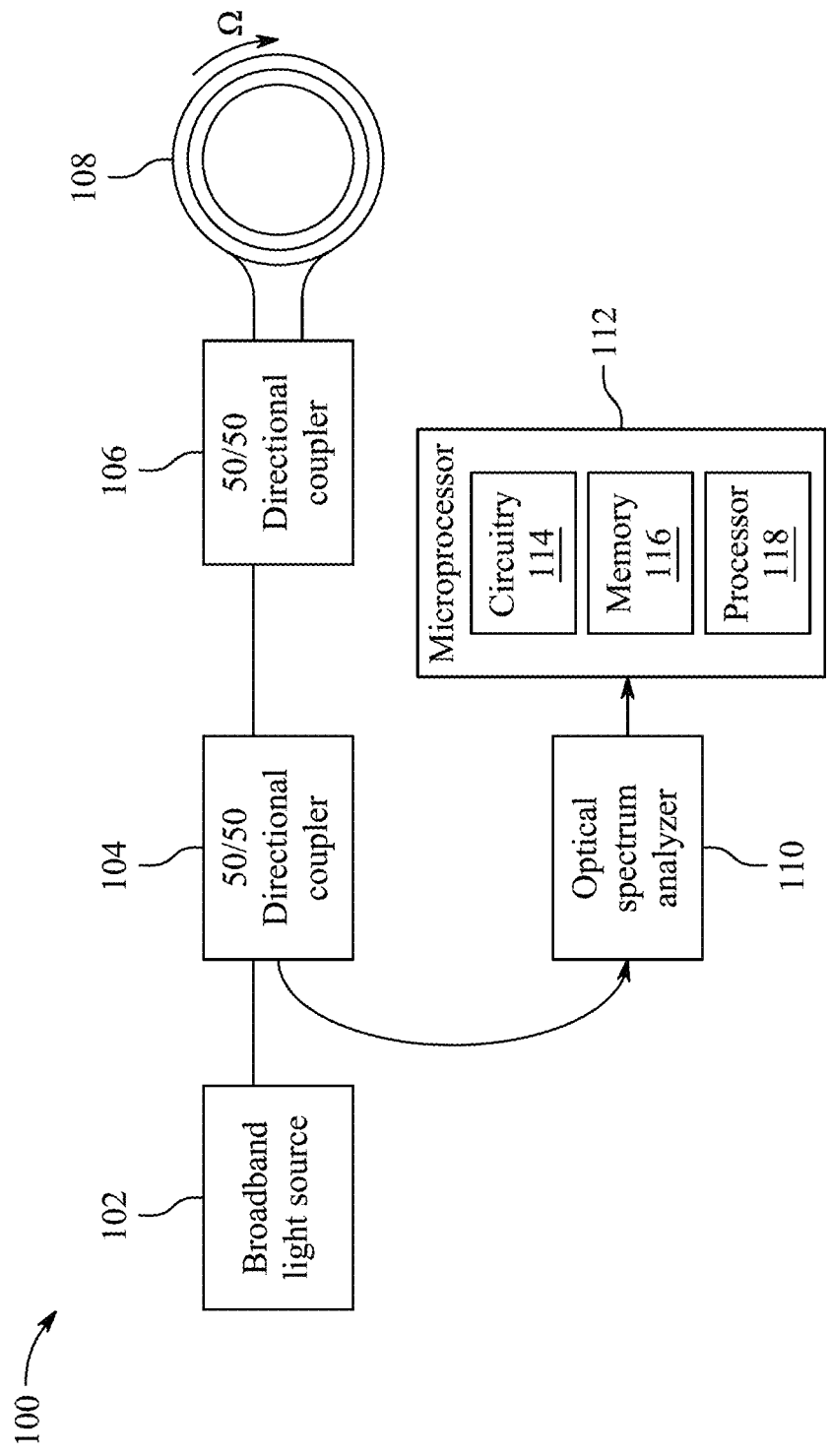
FIG. 1A illustrates a block diagram of a fiber optic gyroscope system, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of this disclosure are directed to a frequency domain interferometry (FDI) based fiber optic gyroscope system and a method for measuring a low-speed angular rotation of the fiber optic gyroscope. The system integrates a feedback loop that allows phase shifts between clockwise and counterclockwise travelling waves in the fiber coil to accumulate over multiple passes. This accumulation amplifies small phase differences caused by slow rotations, which would otherwise be undetectable. By incorporating the feedback loop, the system minimizes complexity and cost, avoiding the need for expensive, high-precision components typically required to enhance sensitivity. As a result, the feedback loop design enables more accurate and robust measurements of extremely low angular speeds. In an aspect, the system leverages the high axial resolution capabilities, enabling resolution precision down to 10 µm. The present disclosure offers a promising solution for applications requiring precise measurements of extremely low rotational speeds, such as advanced navigation systems, aerospace, and defense sectors, providing a cost-effective and simpler alternative.

FIG. 1A illustrates a block diagram of a fiber optic gyroscope system 100, according to certain embodiments.

According to an aspect, the fiber optic gyroscope system 100 (interchangeably referred to as Fourier domain fiber optic gyroscope system 100) includes a broadband light source 102, a first 50/50 directional coupler 104, a second 50/50 directional coupler 106, an optical fiber coil 108, an optical spectrum analyzer 110, and a microprocessor 112. The microprocessor 112 includes a circuitry 114, a memory 116 storing program instructions, and at least one processor 118 configured to execute the program instructions. In an aspect, the broadband light source 102 is a super luminescent diode (SLED) source. Further, the super luminescent diode (SLED) source has a 3 dB linewidth of about 50 nm centered at about 1550 nm. The optical fiber coil 108 has a length of about two kilometers. The first 50/50 directional coupler 104 is connected to the broadband light source 102 at an input port. The optical fiber coil 108 is connected to the second 50/50 directional coupler 106. The first 50/50 directional coupler 104 and the second 50/50 directional coupler 104 are connected to each other. Further, the optical fiber coil 108 includes a plurality of loops. The optical spectrum analyzer 110 is connected to the first 50/50 directional coupler 104. The optical spectrum analyzer 110 is connected to the microprocessor 112.

In an aspect, the broadband light source 102 is configured to transmit light waves. For example, the broadband light source 102 transmits partially incoherent light waves. The first 50/50 directional coupler 104 is configured to split the light waves into a first path and a second path. Further, the second 50/50 directional coupler 106 is configured to split the light waves of the second path into a third path and a fourth path. The optical fiber coil 108 includes a plurality of loops configured to receive the light waves from the third path and the fourth path. The optical fiber coil 108 is configured to circulate the light waves from the third path in a clockwise direction through the plurality of loops and circulate the light waves from the fourth path in a counterclockwise direction through the plurality of loops. According to an aspect, the light waves traveling in the counterclockwise direction are phase-shifted with respect to the light waves traveling in the clockwise direction by the angular rotation of the fiber optic gyroscope 100, wherein the phase-shift is affected by to the speed of the angular rotation.

The second 50/50 directional coupler 106 is configured to recombine the light waves traveling in the clockwise direction and the light waves traveling in the counterclockwise direction. The second 50/50 directional coupler 106 is configured to transmit the set of recombined phase shifted light waves to the first 50/50 directional coupler 104.

The optical spectrum analyzer 110 is configured to receive the set of recombined phase shifted light waves from the first path. The optical spectrum analyzer 110 is further configured to apply frequency domain interferometry to the set of recombined phase shifted light waves and generate an interferogram of the set of recombined phase shifted light waves. The microprocessor 112 is configured to perform a Fast Fourier Transform of the interferogram to transform the interferogram into a set of frequency components having repeated patterns. The microprocessor 112 is further configured to measure the spacing between two repeated patterns of frequency components. The microprocessor 112 is configured to determine, from the measured spacing, an angular rotation speed of the fiber optic gyroscope 100. For example, the measurement of the angular speed has a resolution of about 0.1°/sec. In an aspect, applying a Fast Fourier Transform to the measured interferogram while the fiber optic gyroscope 100 is in rotation allows for the determination of the angular rotation speed (angular velocity) of the fiber optic gyroscope 100.

Figure 1B:
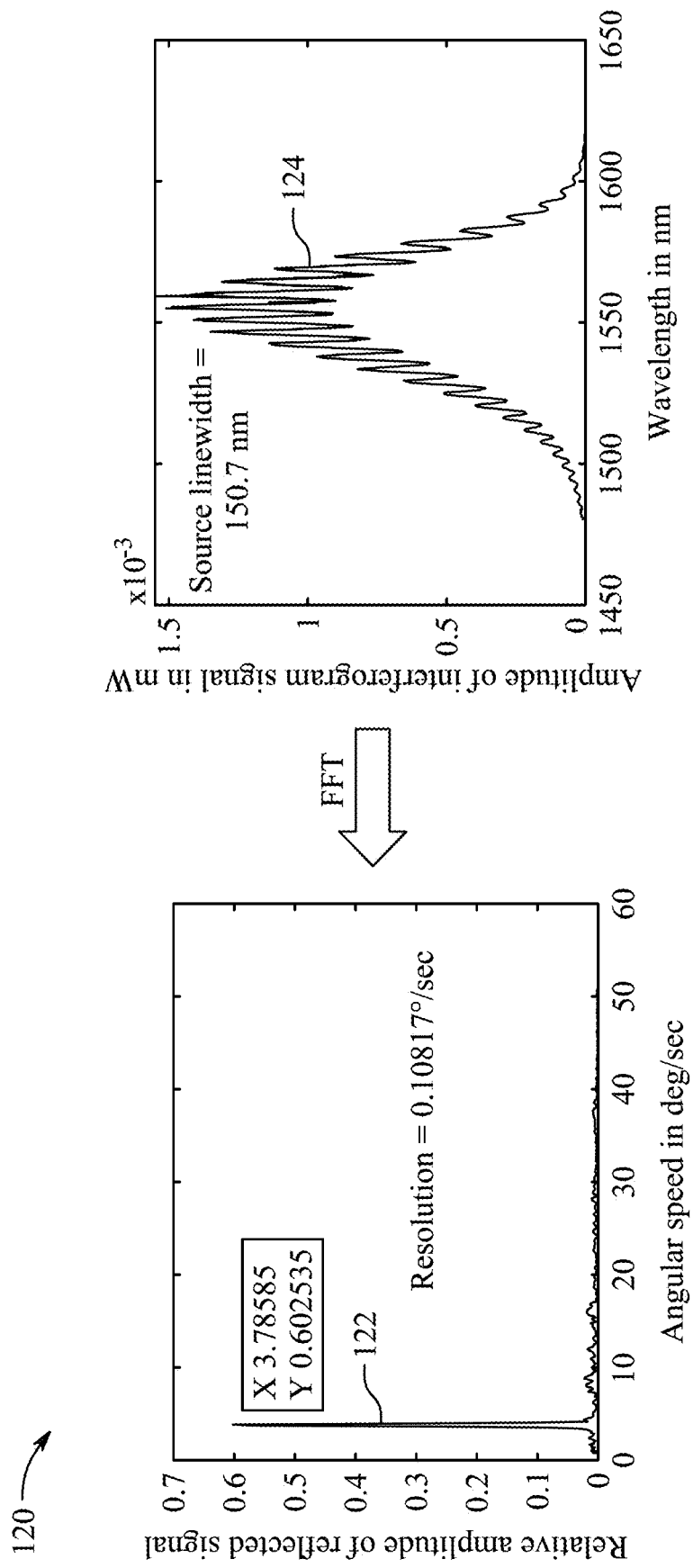
FIG. 1B illustrates a result of applying a Fast Fourier Transform to a measured interferogram to determine an angular rotation speed of the fiber optic gyroscope, according to certain embodiments.

FIG. 1B illustrates a result of applying the Fast Fourier Transform to a measured interferogram to determine an angular rotation speed of the fiber optic gyroscope 100.

In particular, FIG. 1B illustrates a graph representing a measured interferogram while the fiber optic gyroscope 100 rotates with a constant angular velocity. According to an aspect, the interferogram is captured using the optical spectrum analyzer 110. The variations in amplitude correspond to the phase shifts between the waves traveling in clockwise and counterclockwise directions, which are induced by the rotation of fiber optic gyroscope 100. The interferogram provides raw measurements that can be used to calculate the angular velocity of the fiber optic gyroscope 100. As shown in FIG. 1B(a), the measured interferogram 124 spans a spectral window of about 150.7 nm. In an aspect, when the Fast Fourier Transform is applied to the measured interferogram while the fiber optic gyroscope 100 is in rotation, the angular speed of the fiber optic gyroscope 100 is determined. The result of applying the Fast Fourier Transform on the interferogram 122 indicates a constant angular velocity of approximately 1.2 degrees per second. It can be observed in FIG. 1B(b) that the resolution in terms of angular speed is 0.10817°/sec. FIG. 1B also demonstrates the capability of the fiber optic gyroscope system 100 to measure steady rotational speeds with precision.

According to an aspect, the angular speed of the fiber optic gyroscope 100 is measured based on the Sagnac effect.

Upon rotation of the optical fiber coil 108, the path difference between the clockwise waves and the counterclockwise waves is given by Equation (1).

$$\Delta L = \frac{\Omega L^2}{\pi v}, \tag{1}$$

where L is the length of the optical fiber coil 108 and v is the speed of light in the fiber optic gyroscope 100.

Based on Equation (1), the angular speed of the fiber optic gyroscope 100 is expressed as:

$$\Omega = \frac{\Delta L \pi v}{L^2} \quad (2)$$

The phase shift that occurs between the light waves propagating in opposite directions (i.e., clockwise and counterclockwise directions) in the plurality of loops in the optical fiber coil 108 is given by Equation (3) provided below.

$$\Delta \phi = 2\pi \frac{\Omega L^2}{\pi v \lambda} \quad (3)$$

The resolution of the fiber optic gyroscope 100 is inversely proportional to the bandwidth of the broadband light source 102 used, as given by Equation (4) provided below.

$$\text{resolution} = \frac{2 \times \ln(2)}{\pi} \frac{\lambda_o^2}{\Delta \lambda} \quad (4)$$

where $\lambda_o$ is the central wavelength of the light waves (partially incoherent light) and $\Delta \lambda$ is spectral full width at half maximum. For $\lambda_o=1.5$ μm and $\Delta \lambda=50$ nm, the resolution of the fiber optic gyroscope 100 in terms of path difference according to Equation (1) is $\Delta L=19.8$ μm, while the resolution of the fiber optic gyroscope 100 in terms of angular speed according to Equation (2) would be 0.18 degrees per second.

While the fiber optic gyroscope system 100 is effective for measuring angular rotation, the fiber optic gyroscope system 100 does not exhibit the capability to differentiate between clockwise and counterclockwise rotations, thereby limiting its ability to determine the direction of angular rotation. Further, the Fourier-transformed interferogram exhibits a significant DC component, which obscures the signal corresponding to the angular speed. The DC component makes it challenging to accurately measure very low angular velocities, as the DC term overwhelms the signal indicating speed.

According to an aspect, using the broadband light source 102, whose center wavelength is shorter, and with the optical fiber coil 108, which expands the path length, enhances the resolution of the fiber optic gyroscope system 100 and its ability to measure lower angular speeds. However, the fiber optic gyroscope system 100 has limited performance because its sensitivity greatly depends on the fiber coil length. A feedback loop configuration is incorporated into the fiber optic gyroscope system 100 to increase its sensitivity.

Figure 2A:
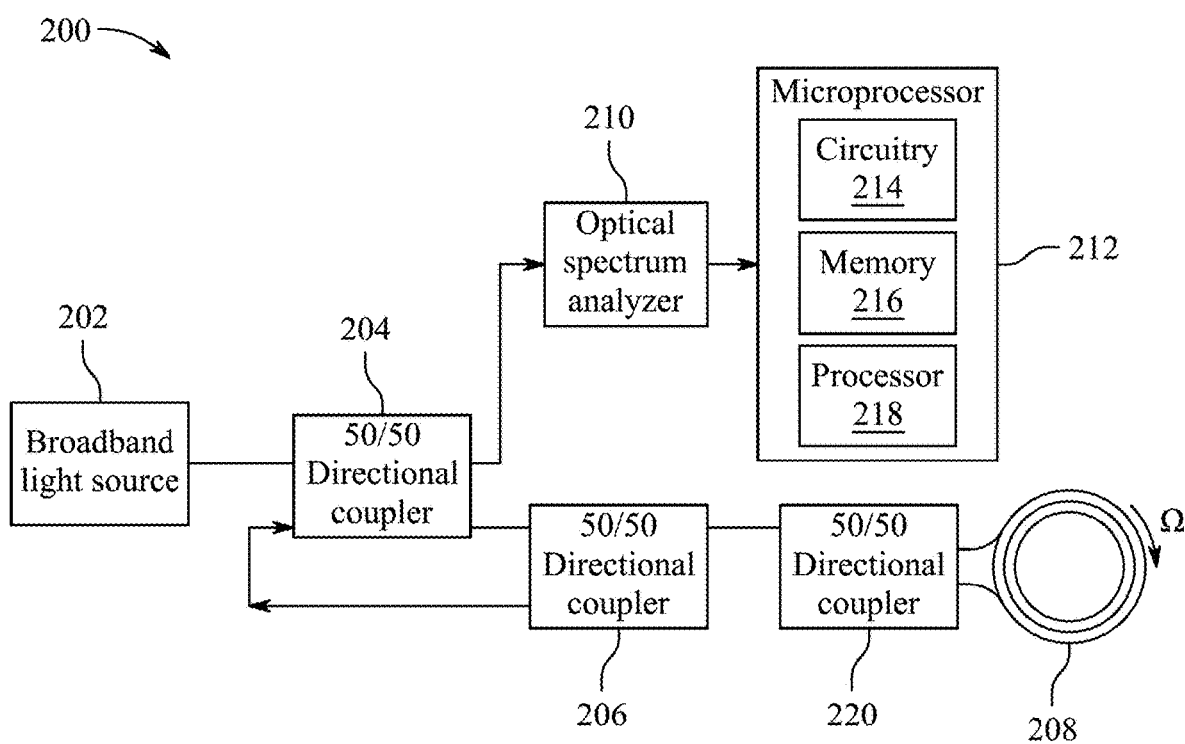
FIG. 2A illustrates a block diagram of a modified fiber optic gyroscope system incorporating a feedback loop configuration, according to certain embodiments.

FIG. 2A illustrates a block diagram of a modified fiber optic gyroscope system 200 incorporating a feedback loop configuration.

According to an aspect, the fiber optic gyroscope system 200 includes a broadband light source 202, a first 50/50 directional coupler 204, a second 50/50 directional coupler 206, a third 50/50 directional coupler 220, an optical fiber coil 208, an optical spectrum analyzer 210, and a microprocessor 212. The microprocessor 212 includes a circuitry 214, a memory 216 storing program instructions, and at least one processor 218 configured to execute the program instructions.

The first 50/50 directional coupler 204 is connected to the broadband light source 202 at an input port. The first 50/50 directional coupler 204 splits the light waves into a first path, which is connected to the optical spectrum analyzer 210 and a second path which travels directly through the second 50/50 directional coupler to the third 50/50 directional coupler, where it is split into the third path and the fourth path. The optical fiber coil 208 is connected to the third 50/50 directional coupler 220. Further, the optical fiber coil 208 includes a plurality of loops. The optical spectrum analyzer 210 is connected to the first 50/50 directional coupler 204. The optical spectrum analyzer 210 is connected to the microprocessor 212.

According to an aspect, the output of the fiber optic gyroscope system 200 is fed back into its input via the third 50/50 directional coupler 220 to the second 50/50 directional coupler 206, which spits the light waves into a fifth path and a sixth path. The fifth path enters the first 50/50 directional coupler 204 and is sent to the optical spectrum analyzer 210. The sixth path also enters the first 50/50 directional coupler 204 but is sent back along the second path to add to the light waves from the broadband light source. This feedback loop configuration enhances the detection capabilities of the fiber optic gyroscope system 200, particularly for low rotational speeds, by continually improving the phase-shift separation with the recombined light waves. In this configuration of the fiber optic gyroscope system 200, the output signal from the fiber loop (i.e., the plurality of loops of the optical fiber coil 208) is partially fed back into the fiber optic gyroscope system 200 to pass through the fiber loop again. Each round trip through the fiber loop results in an additional phase shift between the waves traveling clockwise and counterclockwise, thereby enhancing sensitivity to low rotational speeds.

In an aspect, with each round trip, the phase shift between the clockwise and counterclockwise waves increases by the same amount at the expense of a reduction in their amplitudes due to loop loss caused by directional coupler splitting ratios and fiber cable intrinsic loss. For example, due to this feedback loop, several signals are created at the exit of the Sagnac loop depending upon the number of rounds they undergo in the Sagnac loop. These signals have increasing phase shifts with an increasing number of looping inside the optical fiber coil 208. Since these signals are no longer coherent, the Fast Fourier Transform of the interferogram, in this case, would show a repeated pattern of these signals displayed at increasing phase and increasing angular speed values. However, the fiber optic gyroscope system 200 rotates at a single constant speed. The spacing between these signals corresponds to the actual speed.

At extremely low rotational speeds, the Fast Fourier Transform of the interferogram produces a dominant DC component that can obscure the actual angular speed signal, therefore precise measurement is challenging. The feedback loop configuration is particularly effective for detecting such low speeds, as the separation between the repeated patterns in the interferogram is directly related to the angular speed. The feedback loop configuration effectively shifts the information corresponding to low rotational speeds away from the DC component by repeating it, thereby significantly enhancing the capability of the fiber optic gyroscope system 200 to measure very low angular velocities with improved accuracy and sensitivity.

The feedback loop, however, introduces signal loss, which progressively reduces the amplitude of the traveling waves with each pass due to the splitting ratio of the third 50/50 directional coupler 220 and intrinsic fiber attenuation. By feeding a portion of the light back into the fiber optic gyroscope system 200, the phase shift due to rotation accumulates with each pass through the Sagnac loop, as illustrated in FIG. 2B.

Figure 2B:
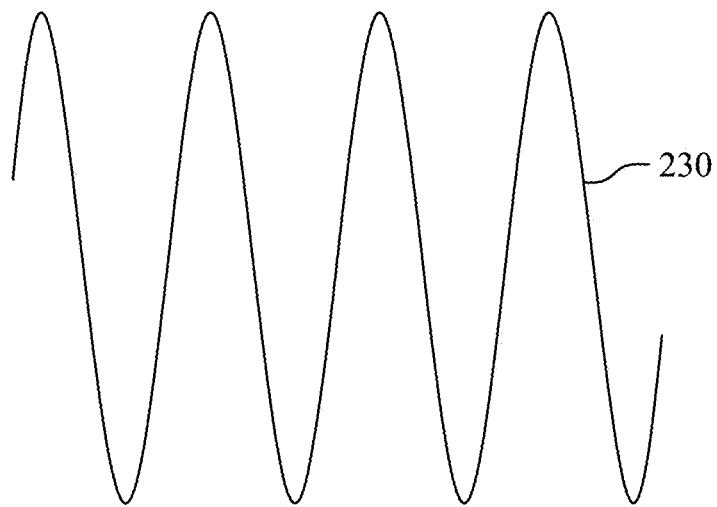
FIG. 2B illustrates a waveform representing a primary input signal of the modified fiber optic gyroscope, according to certain embodiments.
Figure 2C:
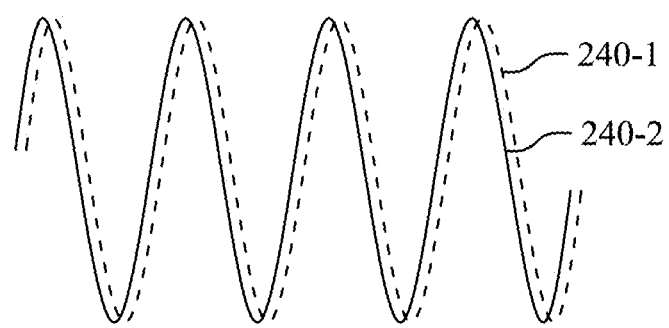
FIG. 2C shows two waveforms created as a result of input signal passing through the modified fiber optic gyroscope, according to certain embodiments.
Figure 2D:
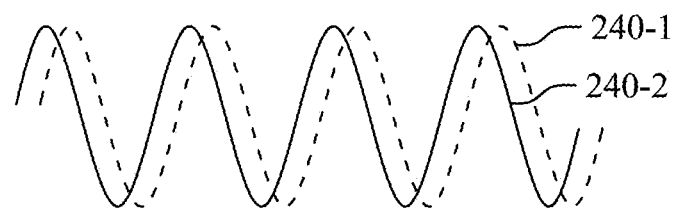
FIG. 2D shows the two waveforms after feedback is applied, according to certain embodiments.

FIG. 2B, FIG. 2C, and FIG. 2D illustrate the signal evolution as it passes through the feedback loop of the fiber optic gyroscope system 200.

In particular, FIG. 2B illustrates a waveform 230 representing a primary input signal of the fiber optic gyroscope system 200.

FIG. 2C shows two waveforms 240-1 and 240-2 created as a result of the input signal passing through the fiber loop of the fiber optic gyroscope system 200.

The two waveforms, 240-1 and 240-2, are generated as the input signal passes through the fiber loop of the fiber optic gyroscope system 200. According to an aspect, two waveforms 240-1 and 240-2 are generated after the input signal is passed through the fiber loop. The waveforms 240-1 and 240-2 are phase-shifted by an amount proportional to the rotation speed of the fiber optic gyroscope system 200.

FIG. 2D shows the waveforms 240-1 and 240-2 after the feedback is applied, As shown in FIG. 2D, as the feedback is applied, the phase difference between the two waveforms 240-1 and 240-2 increases with each subsequent pass (i.e., with each iteration). At the same time, the amplitude decreases due to signal loss from directional couplers and intrinsic fiber attenuation.

Figure 3:
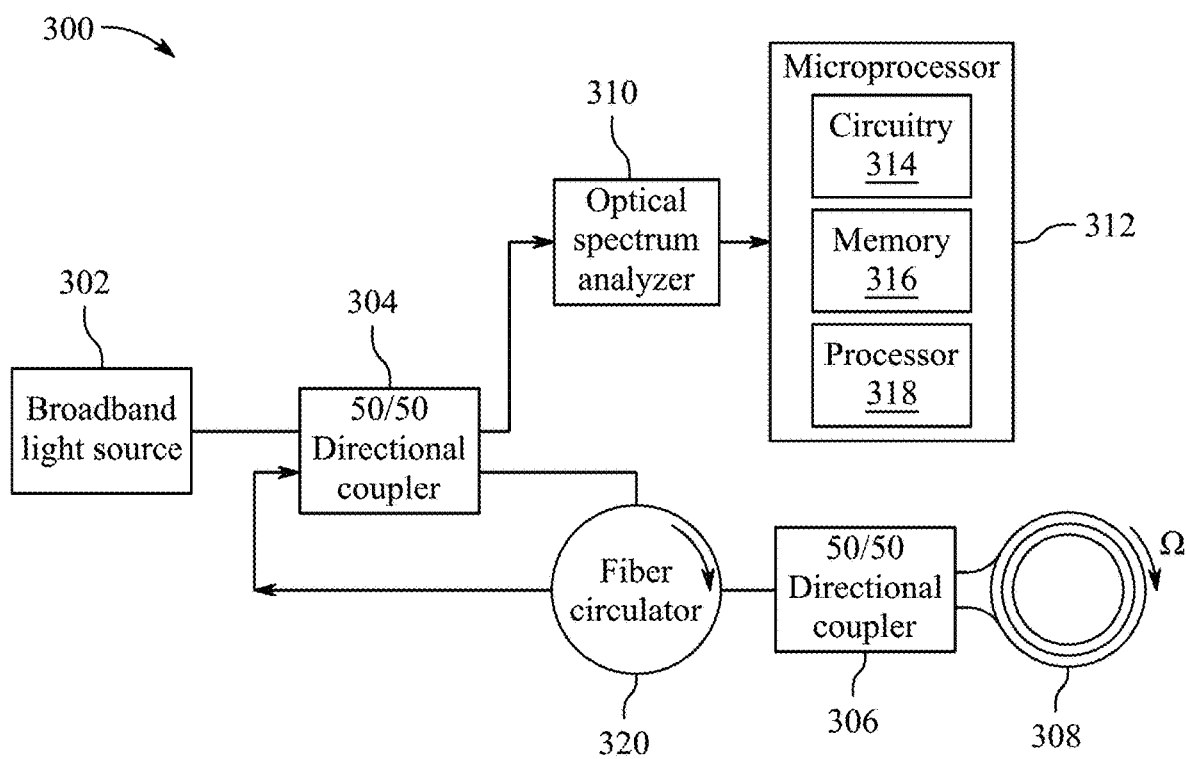
FIG. 3 illustrates an improved fiber optic gyroscope system comprising a fiber circulator, according to certain embodiments.

FIG. 3 illustrates an enhanced fiber optic gyroscope system 300 comprising a fiber circulator 320.

According to an aspect, the fiber optic gyroscope system 300 includes a broadband light source 302, a first 50/50 directional coupler 304, a fiber circulator 320 a second 50/50 directional coupler 306, an optical fiber coil 308, an optical spectrum analyzer 310, and a microprocessor 312. The microprocessor 312 includes a circuitry 314, a memory 316 storing program instructions, and at least one processor 318 configured to execute the program instructions.

According to an aspect, the broadband light source 302 is configured to transmit light waves. The first 50/50 directional coupler 304 is connected at an input port to the broadband light source 302. The first 50/50 directional coupler 304 is configured to split the light waves into a first path and a second path. The three port fiber circulator 320 is connected to the first 50/50 directional coupler 304. The three port fiber circulator 320 is configured to receive the light waves of the second path at a first port and emit the light waves of the second path from a second port. The second 50/50 directional coupler 306 is connected to the second port of the three port fiber circulator 320. The second 50/50 directional coupler 306 is configured to split the light waves of the second path into a third path and a fourth path.

According to an aspect, the optical fiber coil 308 is connected to the second 50/50 directional coupler 306. The optical fiber coil 308 includes a plurality of loops configured to receive the light waves from the third path and the fourth path, circulate the light waves from the third path in a clockwise direction through the plurality of loops and circulate the light waves from the fourth path in a counterclockwise direction through the plurality of loops. The light waves travelling in the counterclockwise direction are phase shifted with respect to the light waves travelling in the clockwise direction based on a rotational speed of the fiber optic gyroscope system 300. In an aspect, the second 50/50 directional coupler 306 is configured to recombine the light waves travelling in the clockwise direction and the light waves travelling in the counterclockwise direction and transmit a set of recombined phase shifted light waves to the second port of the three port fiber circulator 320. The three port fiber circulator 320 is configured to emit the set of recombined phase shifted light waves from a third port, where the third port is connected to a feedback port of the first 50/50 directional coupler 304. The three port fiber circulator 320 is configured to minimize reflections (noise) in the recombined phase shifted light waves and prevent the reflections from adding noise to the recombined phase shifted light waves.

The optical spectrum analyzer 310 is connected to the first path of the first 50/50 directional coupler 304. The optical spectrum analyzer 310 is configured to receive the set of recombined phase shifted light waves from the first path, apply frequency domain interferometry to the set of recombined phase shifted light waves and generate an interferogram of the set of recombined phase shifted light waves. Further, the microprocessor 312 is configured to perform a Fast Fourier Transform of the interferogram to transform the interferogram into a set of frequency components having repeated patterns, measure spacing between two repeated patterns of frequency components, and determine, from the measured spacing, an angular speed of the fiber optic gyroscope system 300.

In FIG. 3, the second 50/50 directional coupler 204 of FIG. 2A is replaced with the three port fiber circulator 320. This modification reduces loop loss by a factor of two, allowing for the detection of more repeated signals in the Fourier-transformed interferogram, thereby increasing the sensitivity of the fiber optic gyroscope system 300. The three port fiber circulator 320 directs the feedback light into the fiber loop more efficiently, reducing signal loss by a factor of two. This modification minimizes attenuation within the feedback loop, facilitating the fiber optic gyroscope system 300 to detect more distinct phase shifts in the interferogram, thereby increasing sensitivity and improving the fiber optic gyroscope system 300 performance in measuring low rotational speeds.

According to an aspect, the broadband light source 302 emits several wavelengths according to a defined line shape function.

The field signal at the output of the Sagnac loop after its first trip is expressed as:

$$E_1 = e^{-\xi}[E_s(\lambda)e^{-j\varphi} + E_s(\lambda)e^{-j\varphi}e^{-j\Delta\varphi}] = e^{-7\mathrm{o}}E_s(\lambda)e^{-j\varphi}[1+e^{-j\Delta\varphi}] \quad (5)$$

where $E_s(\lambda)$ represents the source spectral electric field distribution, $e^{-\xi}$ represents one trip loss in the feedback loop which is assumed constant and not varying with wavelength, $\varphi$ is the common phase that occurs for both the clockwise and the counterclockwise waves, and $\Delta\varphi = n\omega/c\ \Delta L$ is the phase shift between the clockwise and the counterclockwise propagating waves in the Sagnac loop upon rotation (after traveling once in that feedback loop). Both $\varphi$ and $\Delta\varphi$ are functions of wavelength.

The field signal after its second trip in the fiber loop is given by:

$$E_2 = e^{-\xi}E_s(\lambda)e^{-j\varphi}[1+e^{-j\Delta\varphi}] + e^{-2\xi}E(\lambda)e^{-j2\varphi}[1+e^{-j2\Delta\varphi}] \quad (6)$$

Similarly, the field signal after its $n^{th}$ trip in the fiber loop is given by:

$$E_n = e^{-\xi}E_s(\lambda)e^{-j\varphi}[1+e^{-j\Delta\varphi}] + e^{-2\xi}E_s(\lambda)e^{-j2\varphi}[1+e^{-j2\Delta\varphi}] + \ldots + e^{-n\xi}E_s(\lambda)e^{-jn\varphi}[1+e^{-jn\Delta\varphi}] \quad (7)$$

The measured interferogram power is given by:

$$P_m \propto \Sigma_n E_n E_n^* \quad (8)$$

where * stands for the complex conjugate. Since the output of each round trip is no longer coherent with that of another round trip, the measured power is given by:

$$P_m \propto e^{-2\zeta} I_o[2+2\cos\Delta\varphi] + e^{-4\zeta} I_o[2+2\cos 2\Delta\varphi] + \ldots + e^{-2n\zeta} I_o[2+2\cos 2n\Delta\varphi]. \quad (9)$$

where $I_o = E_s(\lambda) E_s^*(\lambda)$

The power Equation (9) after a number of round trips in the optical fiber coil 308 has the following terms: DC component, term in $\cos \Delta\varphi$, term in $\cos 2\Delta\varphi$, a term in $\cos 3\Delta\varphi$, . . . . Summing all these similar terms in this series results in the following components as follows:

$$DC = 2I_o\left[e^{-2\zeta} + e^{-4\zeta} + \cdots\right] = 2I_o e^{-2\zeta}\left[1 + e^{-2\zeta} + \cdots\right] = \frac{2I_o e^{-2\zeta}}{1-e^{-2\zeta}} \quad (10)$$

$$\text{term in } \cos\Delta\varphi = 2I_o e^{-2\zeta}\cos\Delta\varphi \quad (11)$$

$$\text{term in } \cos 2\Delta\varphi = 2I_o e^{-4\zeta}\cos 2\Delta\varphi \quad (12)$$

Since the DC term is much stronger than the other terms, its elimination is necessary to show the other terms clearly. This approach is followed in all the graphs produced by Fourier transforming the measured interferograms. The value of $e^{-2\zeta}$ in for the fiber optic gyroscope system 300 employing the three port fiber circulator 320 equals ¼=0.25 in addition to loss introduced by fiber connectors and intrinsic fiber loss in the 2 km fiber cable.

Figure 4:
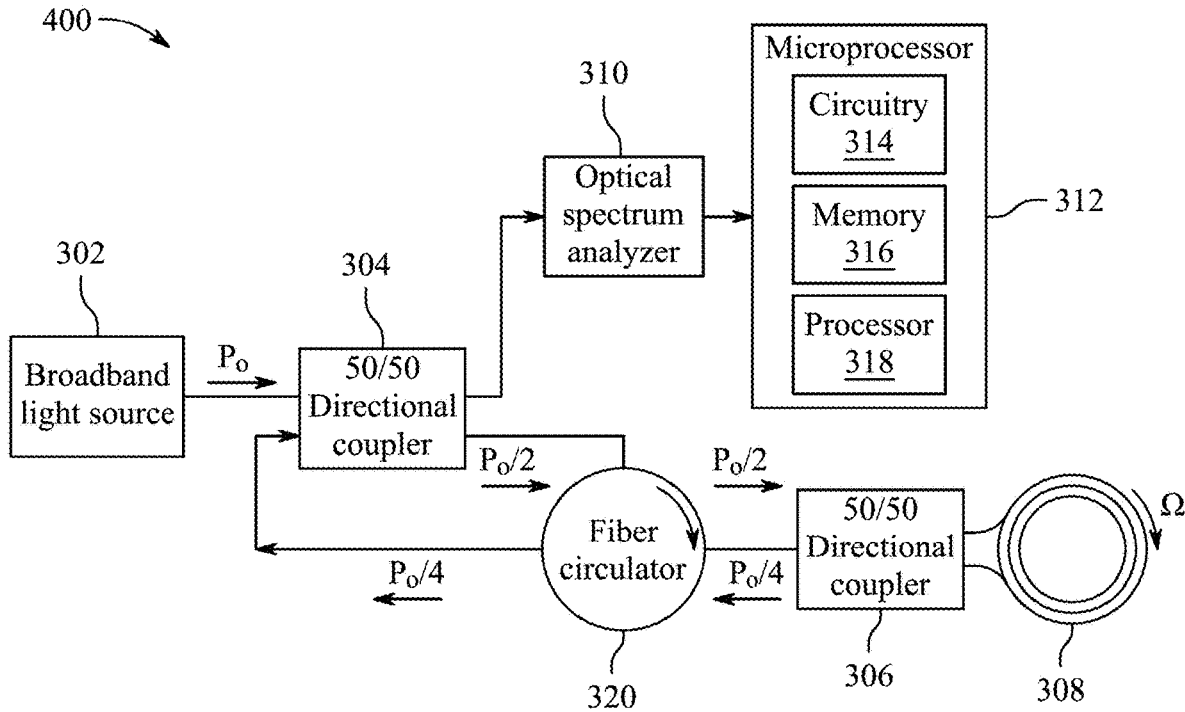
FIG. 4 illustrates progressive signal attenuation for the improved fiber optic gyroscope system, according to certain embodiments.
Figure 5:
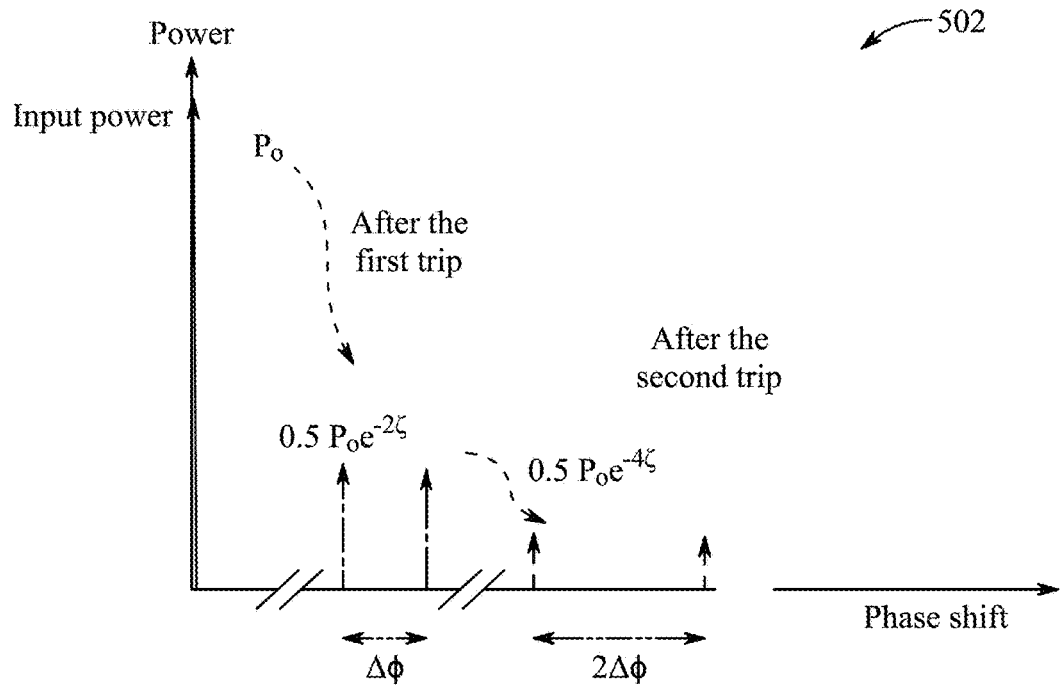
FIG. 5 illustrates a visual representation of continuous power decay and phase shift accumulation in feedback loop, according to certain embodiments.

The ratio between the amplitudes of the $\cos 2\Delta\varphi$ term to the $\cos \Delta\varphi$ term equals ¼=0.25 at each round as discussed in FIG. 4 and FIG. 5. This indicates that with each additional round in the fiber loop, the phase shift increases, but the amplitude of the signal decreases by a factor of 0.25 compared to the previous signal in the phase shift sequence. This progressive reduction in amplitude continues as the light makes more passes through the fiber loop.

FIG. 4 illustrates the progressive signal attenuation with each round trip through the fiber loop of the fiber optic gyroscope system 400.

According to an aspect, each pass results in a reduction of the amplitude of the signal by a factor of four (as represented by $e^{-2\zeta}=¼$). Thus the phase shifted components are scaled by one-fourth relative to their precedents. While the phase shift continues to accumulate, the power of the signal diminishes with each iteration due to coupler losses and intrinsic fiber attenuation.

FIG. 5 illustrates a visual representation 502 of continuous power decay and phase shift accumulation in the feedback loop.

According to an aspect, with each round trip through the fiber loop of the fiber optic gyroscope system 300, the power reduces to a fourth of its preceding amplitude while phase shift increases by the same amount that is caused by a single round trip in this Sagnac loop. This pattern highlights the trade-off between power loss and phase shift accumulation in the fiber optic gyroscope system 300, illustrating how the feedback loop enhances sensitivity to low rotational speeds despite the attenuation.

Referring to FIG. 4 and FIG. 5, each round trip in the optical fiber coil 308 causes a reduction in power by a factor of 4. The first round produces two components split in the phase shift by $\Delta\phi$ and with amplitudes equal to 0.5 $P_o e^{-2\zeta}$ compared to the input power ($P_o$). The second round produces two other components with amplitudes 0.5 $P_o e^{-4\zeta}$ with respect to the input power and split in phase by $2\Delta\phi$.

Figure 6:
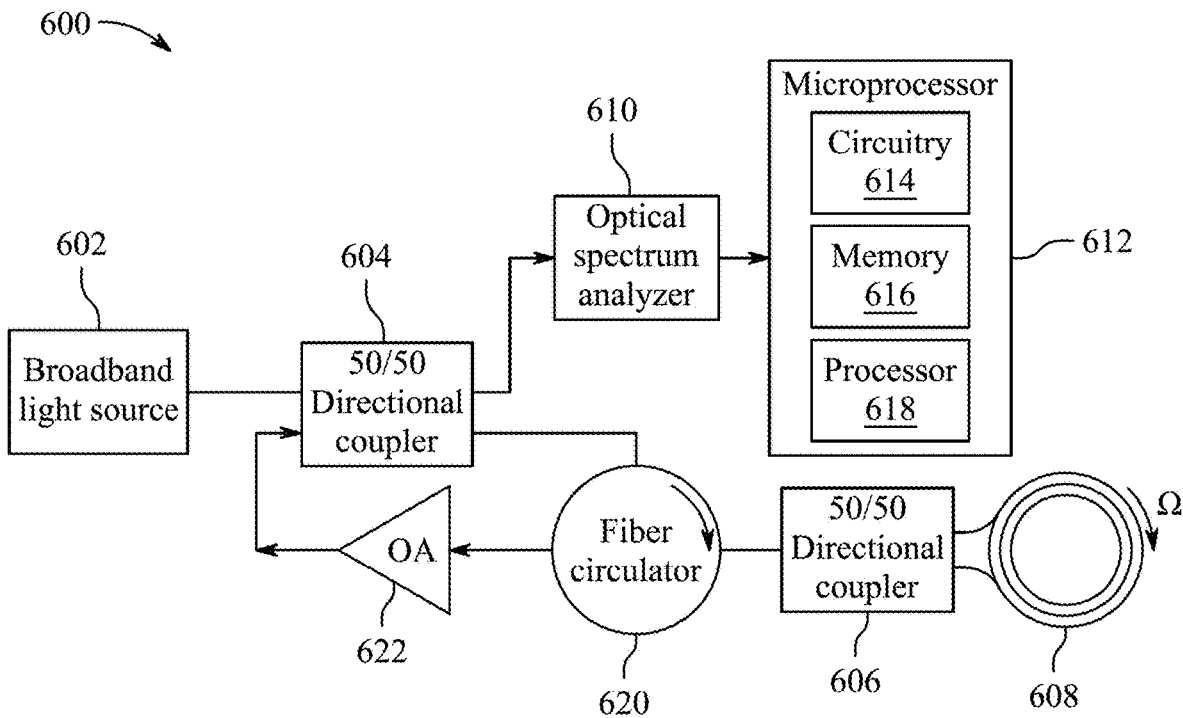
FIG. 6 illustrates a modified fiber optic gyroscope system comprising an optical amplifier for loss compensation, according to certain embodiments.

FIG. 6 illustrates a modified fiber optic gyroscope system 600 comprising an optical amplifier for loss compensation.

According to an aspect, the fiber optic gyroscope system 600 includes a broadband light source 602, a first 50/50 directional coupler 604, a three port fiber circulator 620, a second 50/50 directional coupler 606, an optical fiber coil 608, an optical spectrum analyzer 610, and a microprocessor 612. The microprocessor 612 includes a circuitry 614, a memory 616 storing program instructions, and at least one processor 618 configured to execute the program instructions. The fiber optic gyroscope system 600 further includes an optical amplifier 622. In examples, to overcome the progressive decay in amplitude in the repeated pattern of the Fourier-transformed interferogram due to feedback, the optical amplifier 622 is included in the feedback loop. This modification allows for amplifying the repeated signal components in the Fourier transform domain, thus enhancing the measurement of the small values of angular rotation speeds. In examples, the gain of the optical amplifier 622 is four.

According to an aspect, the broadband light source 602 is configured to transmit light waves. The first 50/50 directional coupler 604 is connected at an input port to the broadband light source 602. The first 50/50 directional coupler 604 is configured to split the light waves into a first path and a second path. The optical amplifier 622 is located between the three port fiber circulator 620 and the feedback port of the first 50/50 directional coupler 604.

The three port fiber circulator 620 is configured to receive the light waves of the second path at a first port and emit the light waves of the second path from a second port. The second 50/50 directional coupler 606 is connected to the second port of the three port fiber circulator 320. The second 50/50 directional coupler 606 is configured split the light waves of the second path into a third path and a fourth path.

According to an aspect, the optical fiber coil 608 is connected to the second 50/50 directional coupler 606. The optical fiber coil 608 includes a plurality of loops configured to receive the light waves from the third path and the fourth path, circulate the light waves from the third path in a clockwise direction through the plurality of loops and circulate the light waves from the fourth path in a counterclockwise direction through the plurality of loops. The light waves traveling in the counterclockwise direction are phase shifted with respect to the light waves traveling in the clockwise direction based on the rotational speed of the fiber optic gyroscope system 600. In an aspect, the second 50/50 directional coupler 606 is configured to recombine the light waves travelling in the clockwise direction and the light waves travelling in the counterclockwise direction and transmit a set of recombined phase shifted light waves to the second port of the three port fiber circulator 620. The three port fiber circulator 620 is configured to emit a set of recombined phase shifted light waves from a third port, where the third port is connected to a feedback port of the first 50/50 directional coupler 604 via the optical amplifier 622. The optical amplifier 622 is configured to amplify the set of recombined phase shifted light waves.

The optical spectrum analyzer 610 is connected to the first path of the first 50/50 directional coupler 604. The optical spectrum analyzer 610 is configured to receive the set of recombined phase shifted light waves from the first path, apply frequency domain interferometry to the set of recombined phase shifted light waves and generate an interferogram of the set of recombined phase shifted light waves. Further, the microprocessor 612 is configured to perform a Fast Fourier Transform of the interferogram to transform the interferogram into a set of frequency components having repeated patterns, measure a spacing between two repeated patterns of frequency components, and determine, from the measured spacing, an angular speed of the fiber optic gyroscope system 600.

According to an aspect, the first 50/50 directional coupler 604 is configured to recirculate the recombined phase shifted light waves from the second path through a feedback path formed by the first port and the second port of the three port fiber circulator 620, the second 50/50 directional coupler 606, the optical fiber coil 608, a return path through the second 50/50 directional coupler 606, the second port and the third port of the three port fiber circulator 620, the optical amplifier 622 and the feedback port of the first 50/50 directional coupler 604. In an aspect, the recirculation of the recombined phase shifted light waves through the feedback path is configured to increase the phase shift.

According to an aspect, the optical amplifier 622 ensures that the signal strength remains sufficient to detect multiple feedback cycles, thereby maintaining the amplitude of the repeated phase shift patterns in the Fourier-transformed interferogram. This modification enhances the ability of the fiber optic gyroscope system 600 to accurately measure low rotational speeds by preventing signal attenuation that would otherwise limit the performance of the fiber optic gyroscope system 600.

Figure 7:
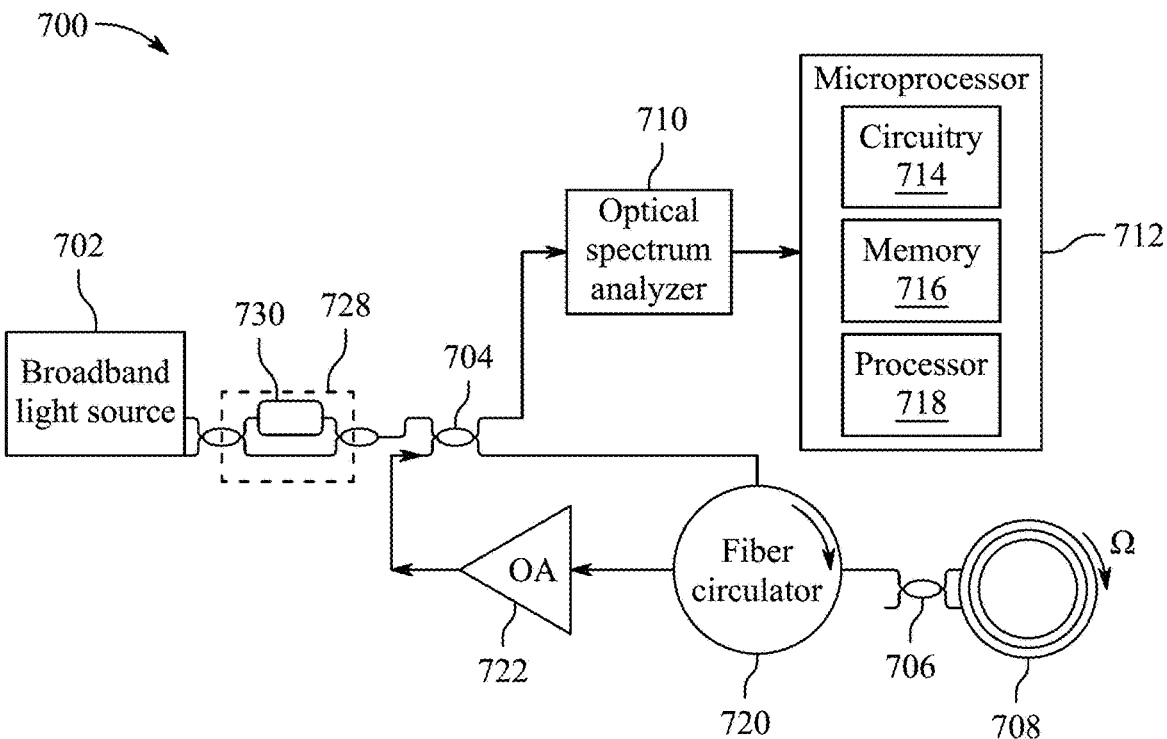
FIG. 7 illustrates a fiber optic gyroscope system including a Mach-Zehnder interferometer, according to certain embodiments.

FIG. 7 illustrates a fiber optic gyroscope system 700 including a Mach-Zehnder interferometer 728.

According to an aspect, the fiber optic gyroscope system 700 includes a broadband light source 702, a first 50/50 directional coupler 704, a second 50/50 directional coupler 706, an optical fiber coil 708, an optical spectrum analyzer 710, and a microprocessor 712. The microprocessor 712 includes a circuitry 714, a memory 716 storing program instructions, and at least one processor 718 configured to execute the program instructions. The fiber optic gyroscope system 700 further includes a three port fiber circulator 720, an optical amplifier 722, and a Mach-Zehnder interferometer 728. The Mach-Zehnder interferometer 728 is configured with a first arm and a second arm. The first arm includes a fiber stretcher 730.

In an aspect, the Mach-Zehnder interferometer 728 is connected between the broadband beam source 702 and the input port of the first 50/50 directional coupler 704. The Mach-Zehnder interferometer 728 is configured to generate an initial phase shift about a midpoint of a frequency of the light waves. In examples, the fiber stretcher 730 is configured to introduce the initial phase shift.

The microprocessor 712 is configured to determine a direction of the angular rotation of the fiber optic gyroscope 700 based on a direction of change in the frequency with respect to the midpoint of a dynamic range of the fiber optic gyroscope system 700. The microprocessor 712 is configured to determine that the direction of rotation of the fiber optic gyroscope 700 is clockwise when the phase shift is greater than the initial phase shift and that the direction of rotation of the fiber optic gyroscope 700 is counterclockwise when the phase shift is less than the initial phase shift.

According to an aspect, the Mach-Zehnder interferometer 728 splits the input light from the broadband light source 702 into two equal parts and creates an initial phase shift between these parts using the fiber stretcher 730 before launching the pre-prepared signal into the fiber loop. This initial phase shift sets the fiber optic gyroscope system 700 at the midpoint of its dynamic range. As the fiber optic gyroscope system 700 rotates, changes in the phase shift indicate the direction of rotation, i.e., whether the phase shift increases (clockwise) or decreases (counterclockwise). This setup not only allows for precise measurement of angular velocity but also provides information about the rotational direction, ensuring a more comprehensive analysis of the motion of the fiber optic gyroscope system 700. This approach improves the overall versatility of the fiber optic gyroscope 700, making it more suitable for applications that require detailed motion analysis, such as inertial navigation and guidance systems.

Results of Basic Gyroscope Setup

The results of the fiber optic gyroscope system 100 of FIG. 1A are presented. The fiber optic gyroscope system 100 is basically studied and examined. The fiber optic gyroscope system 100 was made to rotate at a constant known angular speed with the aid of a rate table. The resulting interferogram produced from combining the clockwise and counterclockwise waves phase shifted due to Sagnac effect in an optical fiber coil 108 of length about 2 kilometers was measured. The interferogram was measured with the aid of the optical spectrum analyzer that operated from 600 to 1700 nm. The source of light used in this experiment was a Super Luminescent Light Emitting Diode (SLED) supplied by Thorlabs which has a 3-dB linewidth of 50 nm centered around 1550 nm.

Figure 8:
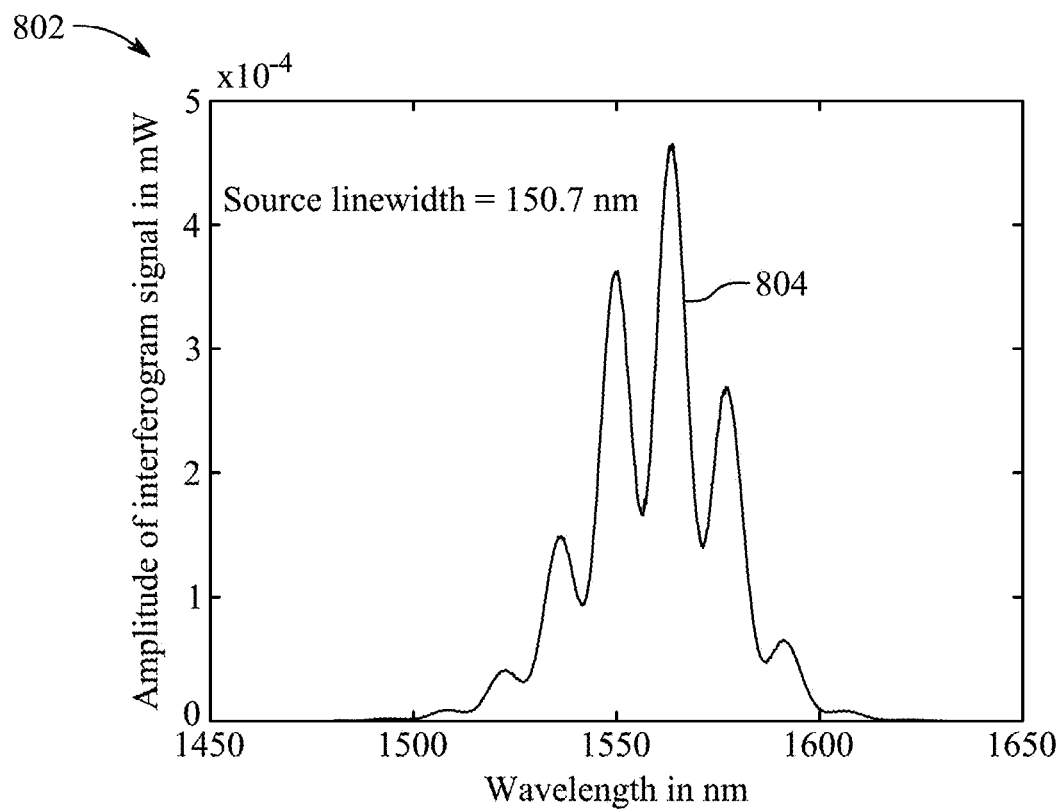
FIG. 8 illustrates a graph representing a measured interferogram in a spectral window, according to certain embodiments.

FIG. 8 illustrates a graph 802 representing the measured interferogram 804 in a spectral window spanning 150.7 nm with a spectral resolution of 0.01 nm.

The interferogram represents the raw measurements that can be used to obtain information about the angular speed with which the fiber optic gyroscope 100 rotates. To obtain the information, the interferogram is first converted from the wavelength domain to the optical frequency domain and adjusted by linear interpolation such as to view the constant spacing in sampling points in the new frequency axis as explained by the MATLAB code.

```
%%% Code to Obtain Angular Speed from an Optical Gyroscope Interferogram
% This script processes a measured interferogram, calculates the source linewidth, and extracts
%angular speed from the signal using frequency domain analysis and FFT.
% INPUT:
% - 'W0036.csv': Interferogram data (Wavelength in nm, Amplitude in mW)
% OUTPUT:
% - Plot of the interferogram
% - Plot of path difference due to rotation vs relative amplitude
% - Plot of angular speed (in degrees/sec) vs relative amplitude
% - Display of calculated source linewidth and resolution
clc; clear; % Clear workspace and command window
% Load interferogram data from CSV file
data = xlsread('W0036.csv'); % Measured interferogram (Wavelength in nm, Amplitude in mW)
wavelengths = data(:, 1); % Wavelength values (in nm)
amplitudes = data(:, 2); % Amplitude of the interferogram signal (in mW)
```

-continued

```
% Plot the original interferogram
figure(1);
plot(wavelengths, amplitudes, 'b', 'LineWidth', 1.5);
xlabel('Wavelength (nm)', 'FontSize', 16);
ylabel('Amplitude (mW)', 'FontSize', 16);
title('Interferogram Signal', 'FontSize', 18);
grid on;
% Calculate the source linewidth
source_linewidth = wavelengths(end) − wavelengths(1);
% Calculate midpoint of the plot for placing the text
x_mid = (wavelengths(1) + wavelengths(end)) / 2;
y_mid = 1.8 * (min(amplitudes) + max(amplitudes)) / 2;
% Display Source Linewidth on the plot
text(x_mid − 100, y_mid, ['Source Linewidth = ', num2str(source_linewidth), ' nm'], 'FontSize',
11, 'Color', 'black', 'FontWeight', 'bold');
% Adjust axis font sizes for publication quality
ax = gca;
ax.XAxis.FontSize = 14;
ax.YAxis.FontSize = 14;
% Convert wavelength to frequency (using c = 3*10^8 m/s)
c = 3e8; % Speed of light in m/s
frequencies = c ./ (wavelengths * 1e-9); % Convert nm to meters
% Interpolate frequency range for even spacing
num_points = length(frequencies); % Number of data points
max_freq = max(frequencies);
min_freq = min(frequencies);
freq_step = (max_freq − min_freq) / num_points;
interp_freq_range = min_freq:freq_step:max_freq;
% Interpolate the amplitudes to match the new frequency range
interp_amplitudes = interp1(frequencies, amplitudes, interp_freq_range);
% Apply FFT to the interpolated signal
fft_amplitudes = abs(fft(interp_amplitudes));
path_difference_scale = (c * 1e3) / (2 * (max_freq − min_freq)); % Path difference scaling
factor
% Remove DC component (first few FFT points)
fft_amplitudes(1:6) = 0;
% Extract meaningful data from the FFT results
fft_result_length = floor(num_points / 32);
fft_processed = fft_amplitudes(1:fft_result_length);
% Calculate path difference due to rotation
path_differences = (1:fft_result_length) * path_difference_scale;
% Plot path difference due to rotation vs relative amplitude
figure(2);
plot(path_differences, fft_processed, 'k', 'LineWidth', 1.25);
xlabel('Path Difference due to Rotation (mm)', 'FontSize', 16);
ylabel('Relative Amplitude of Reflected Signal', 'FontSize', 16);
title('Path Difference vs Reflected Signal', 'FontSize', 18);
grid on;
% Set axis font sizes
ax = gca;
ax.XAxis.FontSize = 14;
ax.YAxis.FontSize = 14;
% Calculate angular speed (in degrees/second) from the path difference
angular_speed_rad = (1e-3 * pi * c / (2000^2)) * path_differences; % Angular speed in
rad/sec
angular_speed_deg = angular_speed_rad * (180 / pi); % Convert to degrees/sec
% Plot angular speed vs relative amplitude
figure(3);
plot(angular_speed_deg, fft_processed, 'k', 'LineWidth', 1.25);
xlabel('Angular Speed (deg/sec)', 'FontSize', 16);
ylabel('Relative Amplitude of Reflected Signal', 'FontSize', 16);
title('Angular Speed vs Reflected Signal', 'FontSize', 18);
grid on;
% Calculate and display resolution
resolution = angular_speed_deg(2) − angular_speed_deg(1);
mid_speed = (angular_speed_deg(end) + angular_speed_deg(1)) / 2;
mid_amplitude = (min(fft_processed) + max(fft_processed)) / 2;
quart_amplitude = 3 * (min(fft_processed) + max(fft_processed)) / 4;
% Display resolution on the plot
text(mid_speed, quart_amplitude, ['Resolution = ', num2str(resolution), ' deg/sec'], 'FontSize',
11, 'Color', 'black', 'FontWeight', 'bold');
% Adjust axis font sizes for publication
ax = gca;
ax.XAxis.FontSize = 14;
ax.YAxis.FontSize = 14;
% End of the code
```

MATLAB code: Angular Speed Calculation

The Fast Fourier Transform was applied to the converted interferogram to transform it from the wavelength domain to the frequency domain in order to determine to angular speed from the phase-shifted frequency peaks.

Figure 9:
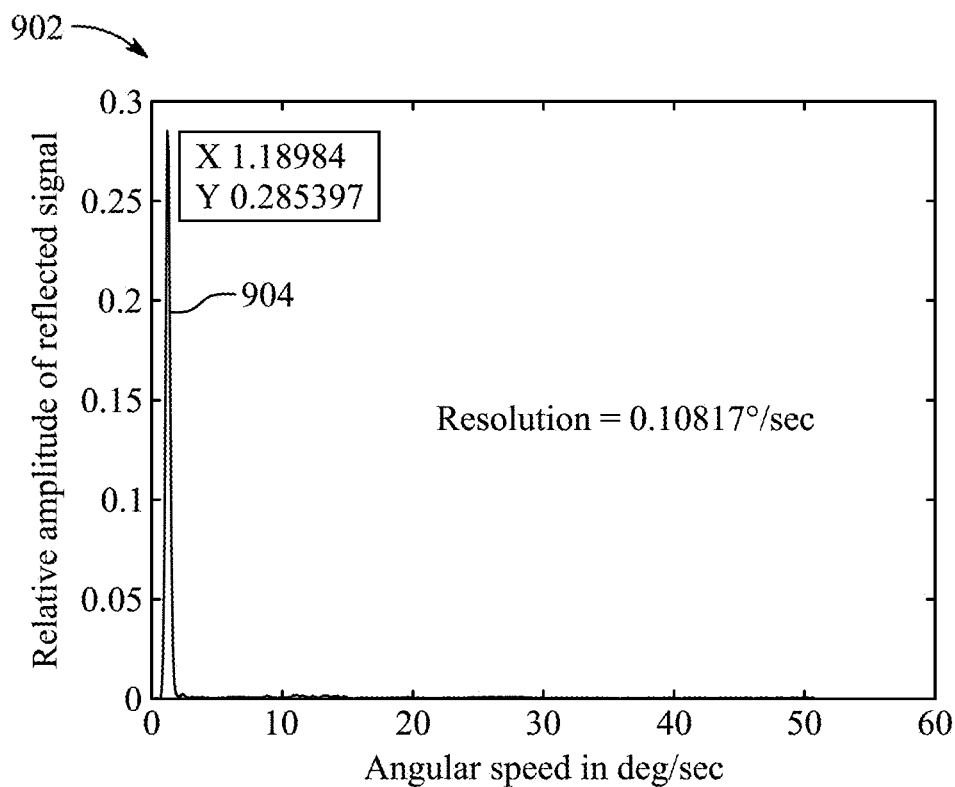
FIG. 9 illustrates a graph that shows results of applying Fast Fourier Transform on the measured interferogram, according to certain embodiments.

FIG. 9 illustrates a graph 902 that shows the results 904 of applying the Fast Fourier Transform on the interferogram of FIG. 8.

As shown in FIG. 9, the angular speed with which the fiber optic gyroscope 100 rotates was measured to be 1.18984°/sec. The resolution in terms of angular speed was found to be 0.10817°/sec which agrees well with that calculated by Equations (2) and (4). Further, a strong DC term as explained by Equation (10) was produced as a result of applying Fast Fourier Transform to the measured interferogram. Therefore, if the fiber optic gyroscope 100 rotates with angular speed less than 0.5 degrees per sec, it becomes difficult to measure the speed because the signal representing speed would be masked by that strong DC component.

Results of Modified Gyroscope Setup

The phase shift between clockwise and counterclockwise propagating waves in the Sagnac fiber coil depends on coil length, and for extremely low angular speeds, this information was masked by the DC component in the Fourier-transformed interferogram. The phase shift was increased to measure extremely low angular speeds without going to the direct solution of increasing coil length. This increase of phase shift for the same fiber coil length was achieved by allowing the light wave to go through the fiber coil several times, making this phase shift move farther away from the DC component and be detected in the Fourier-transformed interferogram.

A feedback loop is added to the basic gyroscope setup as shown in FIG. 2. The output of the Sagnac loop was divided into two parts, one of which is directed towards the optical spectrum analyzer. In contrast, the other part is fed back to the Sagnac loop to undergo the same phase shift each time it traverses the loop. This way, the signal measured by the optical spectrum analyzer represents a combination of waves propagating through the Sagnac coil once, twice, three times, etcetera. Due to source linewidth and optical spectrum analyzer resolution, each group of this combination is not coherent with any other group with a lower or higher number of round trips inside the loop. The addition of these groups at the optical spectrum analyzer contributes only to a DC component, as Equation (10) explains. Whereas inside each group, there are two waves whose phase difference depends on the number of round trips they have inside the Sagnac loop. Only these two waves inside each group interfere, contributing to a modulation at a desired frequency for the measured interferogram. Therefore, the new interferogram 1004 shown in FIG. 10 differs significantly from that measured at the same angular speed as shown previously in FIG. 8. The Fourier transform of the new interferogram produced several components corresponding to these groups displayed at different angular speeds. This repeated pattern shown in FIG. 11 with a spacing equal to the actual angular speed pushes away the signal from the DC component that was hidden at extremely low angular speed values. As can be observed in FIG. 11, the higher the phase shift, the lower the signal amplitude since each additional round trip inside the Sagnac loop costs a reduction in power by factor four. For more accurate determination of the angular speed, separation between many of these displayed components appearing in FIG. 11 can be measured and divided by their number. The higher the output power from the broadband light source 202, higher the detected displayed components.

Figure 10:
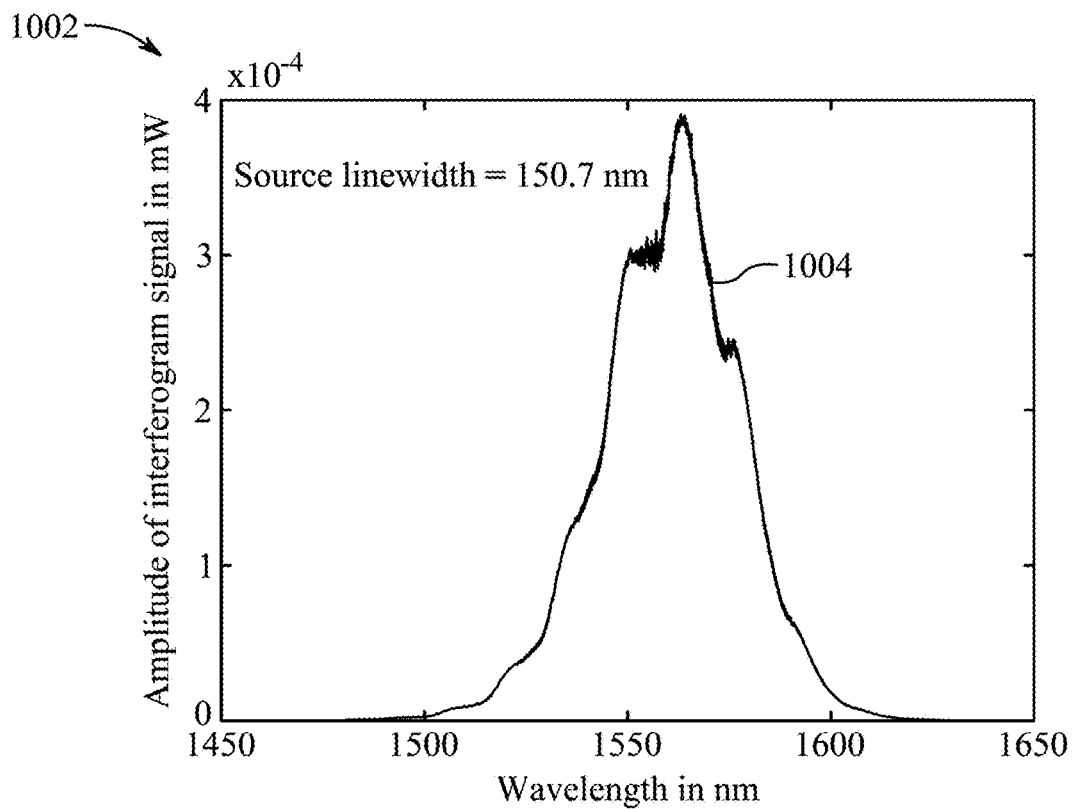
FIG. 10 illustrates a graph representing a measured interferogram based on feedback loop, according to certain embodiments.

FIG. 10 illustrates a graph 1002 representing a measured interferogram based on applying feedback as shown by FIG. 3.

In one aspect, the feedback loop causes the light waves to pass through the fiber loop multiple times, resulting in phase shifts accumulating with each pass. The interferogram now includes additional modulations corresponding to the repeated phase shifts, which makes it look different from that of FIG. 8 captured at the same angular speed without applying feedback.

Figure 11:
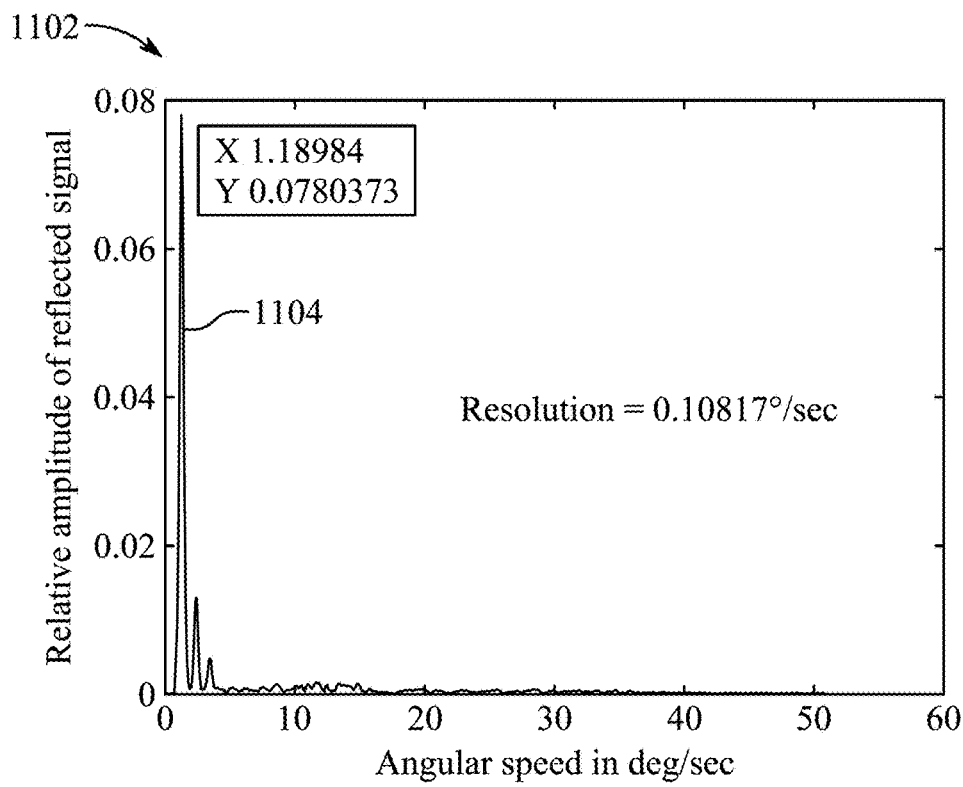
FIG. 11 illustrates a graph representing the result of applying Fast Fourier Transform on the measured interferogram, according to certain embodiments.

FIG. 11 illustrates a graph 1102 representing the result of applying Fast Fourier Transform on the measured interferogram.

The Fourier-transformed interferogram 1104 as shown in FIG. 11 reveals multiple repeated components with decreasing amplitudes, each corresponding to a feedback cycle. These repeated components are spaced according to the gyroscope's angular speed, allowing for precise detection of low-speed rotations. The reduction in amplitude is due to signal loss within the feedback loop.

In an exemplary embodiment, a fiber optic gyroscope system is described. The fiber optic gyroscope system includes a broadband light source configured to transmit light waves, a first 50/50 directional coupler connected at an input port to the broadband light source, where the first 50/50 directional coupler is configured to split the light waves into a first path and a second path, and a three port fiber circulator connected to the first 50/50 directional coupler, where the three port fiber circulator is configured to receive the light waves of the second path at a first port and emit the light waves of the second path from a second port. The fiber optic gyroscope system includes a second 50/50 directional coupler connected to the second port of the three port fiber circulator, where the second 50/50 directional coupler is configured split the light waves of the second path into a third path and a fourth path, an optical fiber coil connected to the second 50/50 directional coupler, where the optical fiber coil includes a plurality of loops configured to receive the light waves from the third path and the fourth path, circulate the light waves from the third path in a clockwise direction through the plurality of loops and circulate the light waves from the fourth path in a counterclockwise direction through the plurality of loops, where the light waves travelling in the counterclockwise direction are phase shifted with respect to the light waves travelling in the clockwise direction based on a rotational speed of the fiber optic gyroscope.

The second 50/50 directional coupler is configured to recombine the light waves travelling in the clockwise direction and the light waves travelling in the counterclockwise direction and transmit a set of recombined phase shifted light waves to the second port of the three port fiber circulator, where the three port fiber circulator is configured to emit the a set of recombined phase shifted light waves from a third port, wherein the third port is connected to a feedback port of the first 50/50 directional coupler. Aan optical spectrum analyzer connected to the first path of the first 50/50 directional coupler, where the optical spectrum analyzer is configured to receive the set of recombined phase shifted light waves from the first path, apply frequency domain interferometry to the set of recombined phase shifted light waves and generate an interferogram of the set of recombined phase shifted light waves.

The fiber optic gyroscope system includes a microprocessor including a circuitry, a memory storing program instructions and at least one processor configured to execute the program instructions to: perform a Fast Fourier Transform of the interferogram to transform the interferogram into a set of frequency components having repeated patterns, measure a spacing between two repeated patterns of frequency components, and determine, from the measured spacing, an angular speed of the fiber optic gyroscope.

In an aspect, the fiber optic gyroscope system comprises an optical amplifier located between the fiber circulator and the feedback port of the first 50/50 directional coupler, where the optical amplifier is configured to amplify the set of recombined phase shifted light waves.

In an aspect, a gain of the optical amplifier is four.

In an aspect, the first 50/50 directional coupler is configured to recirculate the recombined phase shifted light waves from the second path through a feedback path formed by the first port and the second port of the three port fiber circulator, the second 50/50 directional coupler, the optical fiber coil, a return path through the second 50/50 directional coupler, the second port and the third port of the three port fiber circulator, the optical amplifier and the feedback port of the first 50/50 directional coupler.

In an aspect, the recirculation of the recombined phase shifted light waves through the feedback path is configured to increase the phase shift.

In an aspect, the fiber optic gyroscope system comprises a Mach-Zehnder interferometer connected between the broadband beam source and the input port of the first 50/50 directional coupler, wherein the Mach-Zehnder interferometer is configured to generate an initial phase shift about a midpoint of a frequency of the light waves, wherein the microprocessor is configured to determine a direction of the angular rotation of the fiber optic gyroscope based on a direction of change in the frequency with respect to the midpoint of a dynamic range of the fiber optic gyroscope system.

In an aspect, the Mach-Zehnder interferometer is configured with a first arm and a second arm, wherein the first arm includes a fiber stretcher configured to introduce the initial phase shift.

In an aspect, the microprocessor is configured to determine that the direction of rotation of the fiber optic gyroscope is clockwise when the phase shift is greater than the initial phase shift and that the direction of rotation of the fiber optic gyroscope is counterclockwise when the phase shift is less than the initial phase shift.

In an aspect, the optical fiber coil has a length of about two kilometers.

In an aspect, the broadband light source is a super luminescent diode (SLED) source.

In an aspect, the super luminescent diode (SLED) source has 3 dB linewidth of about 50 nm centered about 1550 nm.

In an aspect, a measurement of the angular speed has a resolution of about 0.1°/sec.

In another exemplary embodiment, a method for measuring a low speed angular rotation of a fiber optic gyroscope. The method includes generating, with a broadband light source, a beam of light waves, splitting, by a first 50/50 directional coupler, the beam of light waves into a first path and a second path, transmitting, through a first port and a second port of a three port fiber circulator, the light waves of the second path to a second 50/50 directional coupler, splitting, by the second 50/50 directional coupler, the light waves of the second path into a third path and a fourth path, coupling the light waves of the third path into a first port of an optical fiber coil configured with a plurality of loops, wherein the light waves of the third path circulate in a clockwise direction within the plurality of loops, coupling the light waves of the fourth path into a second port of the optical fiber coil, wherein the light waves of the fourth path circulate in a counterclockwise direction within the plurality of loops, wherein the light waves circulating in the counterclockwise direction phase shift with respect to the light waves travelling in the clockwise direction based on a rotational speed of the fiber optic gyroscope when the fiber optic gyroscope is rotating. The method further includes recombining, by the second 50/50 directional couple, the light waves circulating in the clockwise direction and the light waves circulating in the counterclockwise direction and transmitting the recombined phase shifted light waves to the second port of the three port fiber circulator, emitting, from a third port of the three port fiber circulator the recombined phase shifted light waves, receiving, by a feedback port of the first 50/50 directional coupler, the recombined phase shifted light waves, receiving, by an optical spectrum analyzer, the recombined phase shifted light waves from the first path of the first 50/50 directional coupler, and generating, by the optical spectrum analyzer, an interferogram of the recombined phase shifted light waves. The method further includes receiving, by a microprocessor, the interferogram, applying, by the microprocessor, a Fast Fourier Transform to the interferogram, where the Fast Fourier Transform is configured to transform the interferogram into a set of frequency components having repeated patterns, measuring, by the microprocessor, a spacing between two repeated patterns of frequency components, and determining, from the measured spacing, a speed of an angular rotation of the fiber optic gyroscope.

In an aspect, the method includes amplifying, by an amplifier connected between the third port of the three port fiber circulator and the feedback port of the first 50/50 directional coupler, the recombined phase shifted light waves.

In an aspect, the method includes increasing the phase shift by recirculating, from the second path of the first 50/50 directional coupler, the recombined phase shifted light waves through a feedback path formed by the first port and the second port of the three port fiber circulator, the second 50/50 directional coupler, the optical fiber coil, a return path through the second 50/50 directional coupler, the second port and the third port of the three port fiber circulator, the optical amplifier and the feedback port of the first 50/50 directional coupler.

In an aspect, the method includes generating an initial phase shift centered about a midpoint of a frequency of the light waves by connecting a Mach-Zehnder interferometer between the broadband light source and an input port of the first 50/50 directional coupler.

In an aspect, the method includes determining, by the microprocessor, a direction of the angular rotation of the fiber optic gyroscope based on a direction of change in the frequency with respect to the midpoint of a dynamic range of the fiber optic gyroscope.

In an aspect, the method includes determining, by the microprocessor, that the direction of rotation of the fiber optic gyroscope is clockwise when the phase shift is greater than the initial phase shift and that the direction of rotation of the fiber optic gyroscope is counterclockwise when the phase shift is less than the initial phase shift.

In an aspect, the method includes generating the broadband light waves by a super luminescent diode source having 3 dB linewidth of about 50 nm centered about 1550 nm.

In an aspect, the optical fiber coil is configured to have a coil length of about two kilometers.

Figure 12:
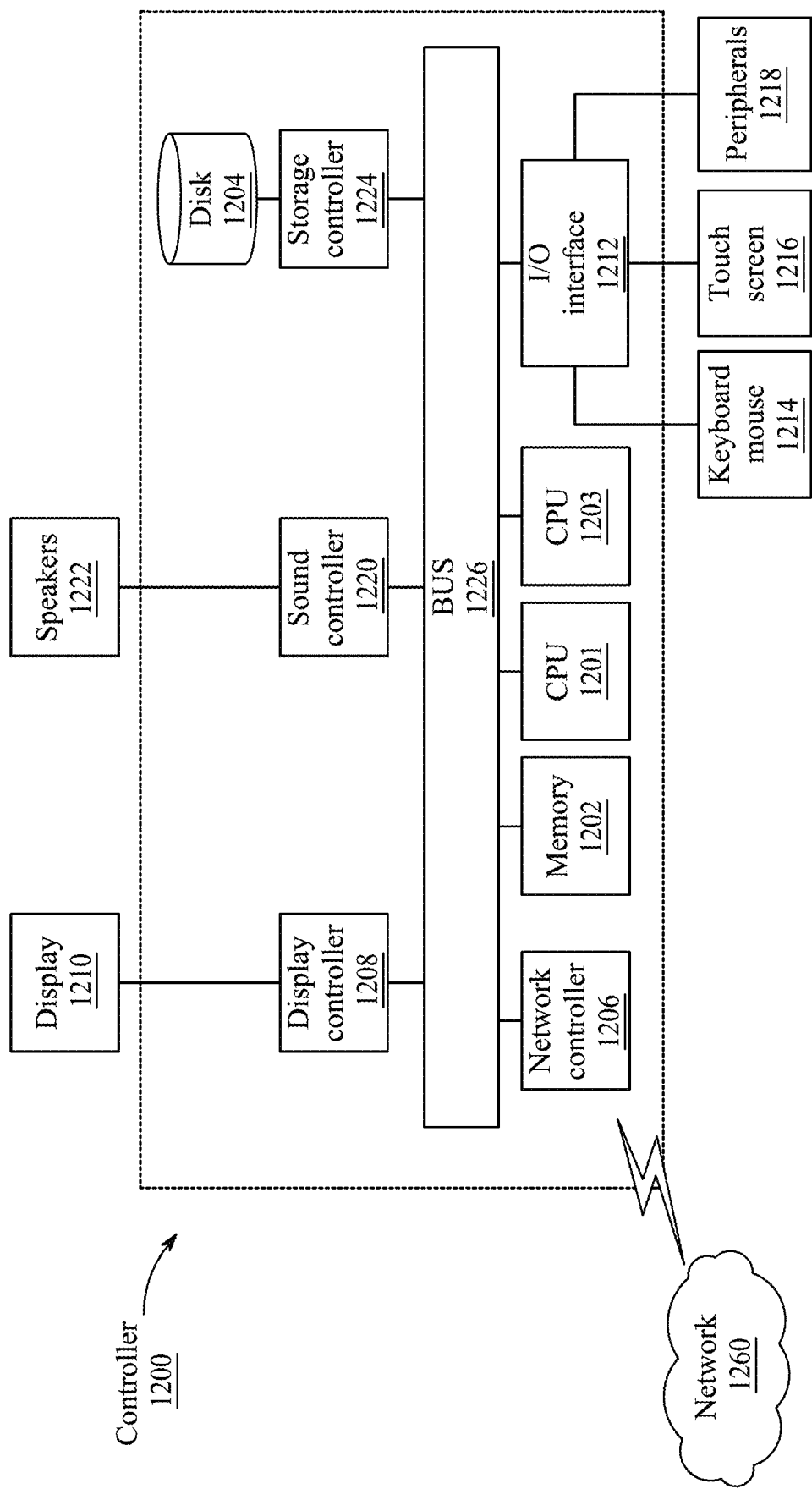
FIG. 12 is an illustration of a non-limiting example of details of computing hardware used in the computing system, according to certain embodiments.

Next, further details of the hardware description of the computing environment according to exemplary embodiments is described with reference to FIG. 12. In FIG. 12, a controller 1200 is described is representative of the microprocessor 712 of FIG. 7 in which the controller is a computing device which includes a CPU 1201 which performs the processes described above/below. The process data and instructions may be stored in memory 1202. These processes and instructions may also be stored on a storage medium disk 1204 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1201, 1203 and an operating system such as Microsoft Windows 7, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 1201 or CPU 1203 may be a Xenon or Core processor from Intel of America or an Opteron processor from AMD of America, or may be other processor types that would be recognized by one of ordinary skill in the art. Alternatively, the CPU 1201, 1203 may be implemented on an FPGA, ASIC, PLD or using discrete logic circuits, as one of ordinary skill in the art would recognize. Further, CPU 1201, 1203 may be implemented as multiple processors cooperatively working in parallel to perform the instructions of the inventive processes described above.

The computing device in FIG. 12 also includes a network controller 1206, such as an Intel Ethernet PRO network interface card from Intel Corporation of America, for interfacing with network 1260. As can be appreciated, the network 1260 can be a public network, such as the Internet, or a private network such as an LAN or WAN network, or any combination thereof and can also include PSTN or ISDN sub-networks. The network 1260 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 1208, such as a NVIDIA GeForce GTX or Quadro graphics adaptor from NVIDIA Corporation of America for interfacing with display 1210, such as a Hewlett Packard HPL2445w LCD monitor. A general purpose I/O interface 1212 interfaces with a keyboard and/or mouse 1214 as well as a touch screen panel 1216 on or separate from display 1210. General purpose I/O interface also connects to a variety of peripherals 1218 including printers and scanners, such as an OfficeJet or DeskJet from Hewlett Packard.

A sound controller 1220 is also provided in the computing device such as Sound Blaster X-Fi Titanium from Creative, to interface with speakers/microphone 1222 thereby providing sounds and/or music.

The general purpose storage controller 1224 connects the storage medium disk 1204 with communication bus 1226, which may be an ISA, EISA, VESA, PCI, or similar, for interconnecting all of the components of the computing device. A description of the general features and functionality of the display 1210, keyboard and/or mouse 1214, as well as the display controller 1208, storage controller 1224, network controller 1206, sound controller 1220, and general purpose I/O interface 1212 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 13.

Figure 13:
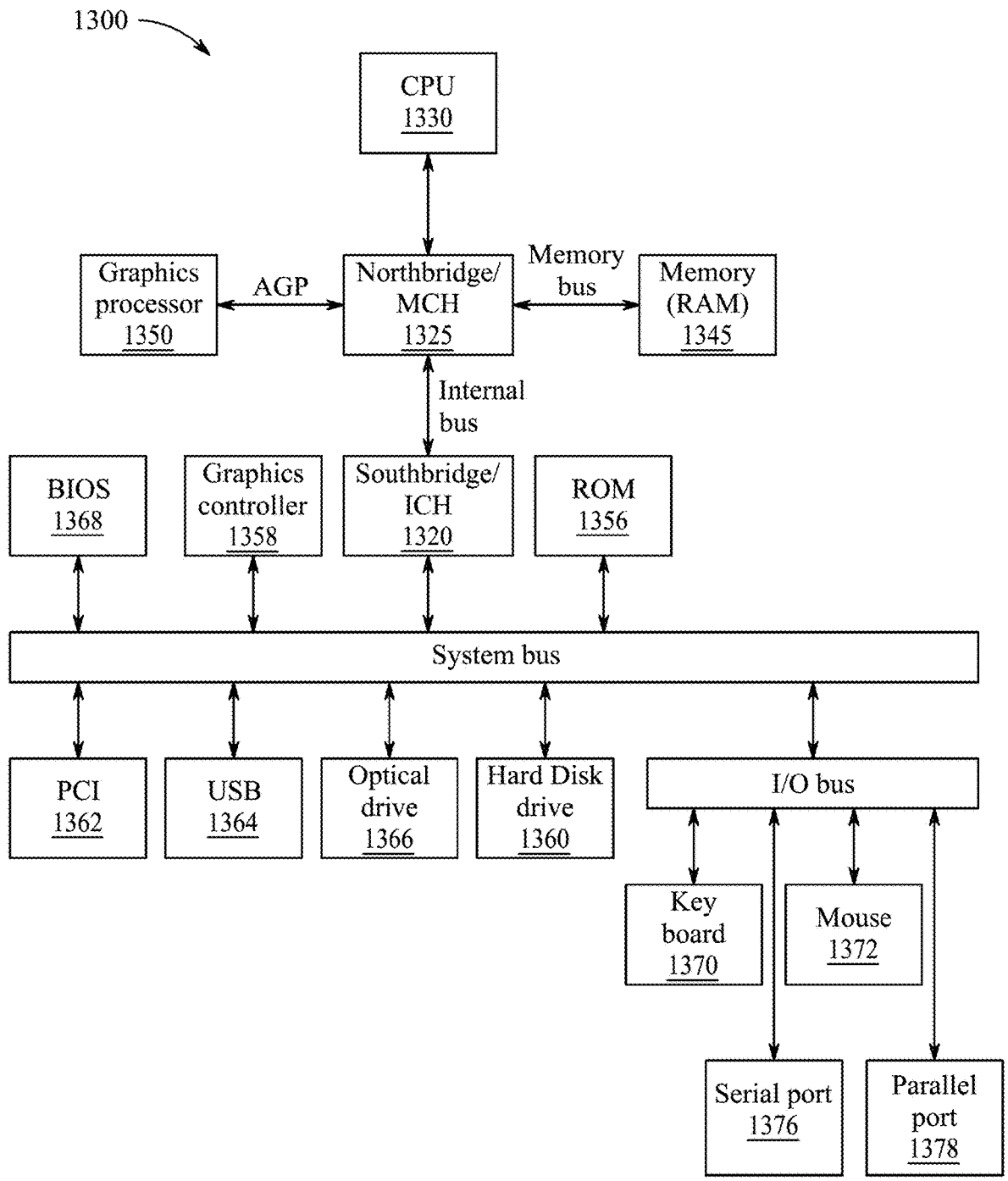
FIG. 13 is an exemplary schematic diagram of a data processing system used within the computing system, according to certain embodiments.

FIG. 13 shows a schematic diagram of a data processing system, according to certain embodiments, for performing the functions of the exemplary embodiments. The data processing system is an example of a computer in which code or instructions implementing the processes of the illustrative embodiments may be located.

In FIG. 13, data processing system 1300 employs a hub architecture including a north bridge and memory controller hub (NB/MCH) 1325 and a south bridge and input/output (I/O) controller hub (SB/ICH) 1320. The central processing unit (CPU) 1330 is connected to NB/MCH 1325. The NB/MCH 1325 also connects to the memory 1345 via a memory bus, and connects to the graphics processor 1350 via an accelerated graphics port (AGP). The NB/MCH 1325 also connects to the SB/ICH 1320 via an internal bus (e.g., a unified media interface or a direct media interface). The CPU Processing unit 1330 may contain one or more processors and even may be implemented using one or more heterogeneous processor systems.

Figure 14:
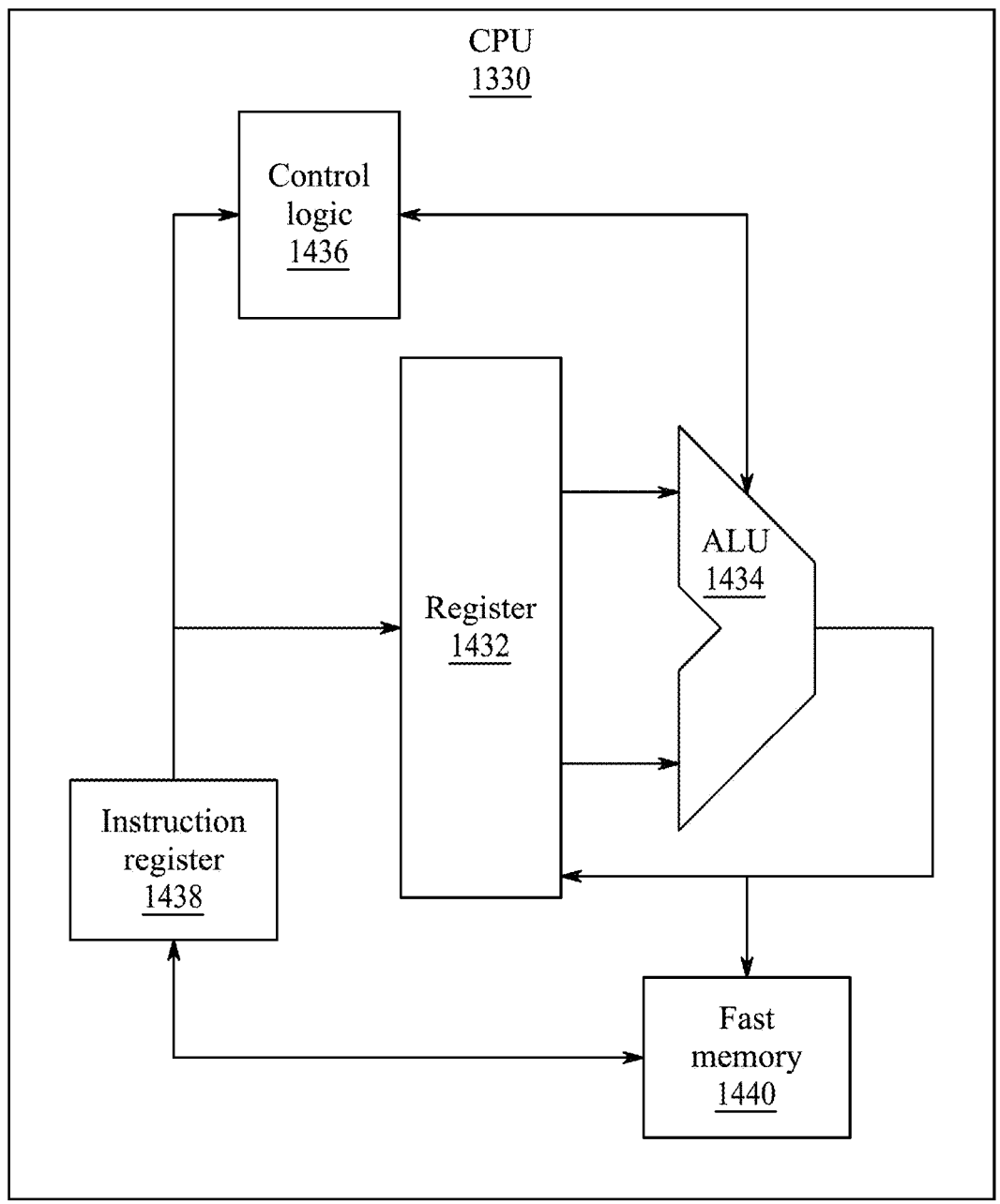
FIG. 14 is an exemplary schematic diagram of a processor used with the computing system, according to certain embodiments.

For example, FIG. 14 shows one implementation of CPU 1330. In one implementation, the instruction register 1438 retrieves instructions from the fast memory 1440. At least part of these instructions is fetched from the instruction register 1438 by the control logic 1436 and interpreted according to the instruction set architecture of the CPU 1330. Part of the instructions can also be directed to the register 1432. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1434 that loads values from the register 1432 and performs logical and mathematical operations on the loaded values according to the instructions. The results from these operations can be feedback into the register and/or stored in the fast memory 1440. According to certain implementations, the instruction set architecture of the CPU 1330 can use a reduced instruction set architecture, a complex instruction set architecture, a vector processor architecture, a very large instruction word architecture. Furthermore, the CPU 1330 can be based on the Von Neuman model or the Harvard model. The CPU 1330 can be a digital signal processor, an FPGA, an ASIC, a PLA, a PLD, or a CPLD. Further, the CPU 1330 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 13, the data processing system 1300 can include that the SB/ICH 1320 is coupled through a system bus to an I/O Bus, a read only memory (ROM) 1356, universal serial bus (USB) port 1364, a flash binary input/output system (BIOS) 1368, and a graphics controller 1358. PCI/PCIe devices can also be coupled to SB/ICH 1388 through a PCI bus 1362.

The PCI devices may include, for example, Ethernet adapters, add-in cards, and PC cards for notebook computers. The Hard disk drive 1360 and CD-ROM 1366 can use, for example, an integrated drive electronics (IDE) or serial advanced technology attachment (SATA) interface. In one implementation the I/O bus can include a super I/O (SIO) device.

Further, the hard disk drive (HDD) 1360 and optical drive 1366 can also be coupled to the SB/ICH 1320 through a system bus. In one implementation, a keyboard 1370, a mouse 1372, a parallel port 1378, and a serial port 1376 can be connected to the system bus through the I/O bus. Other peripherals and devices that can be connected to the SB/ICH 1320 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 15:
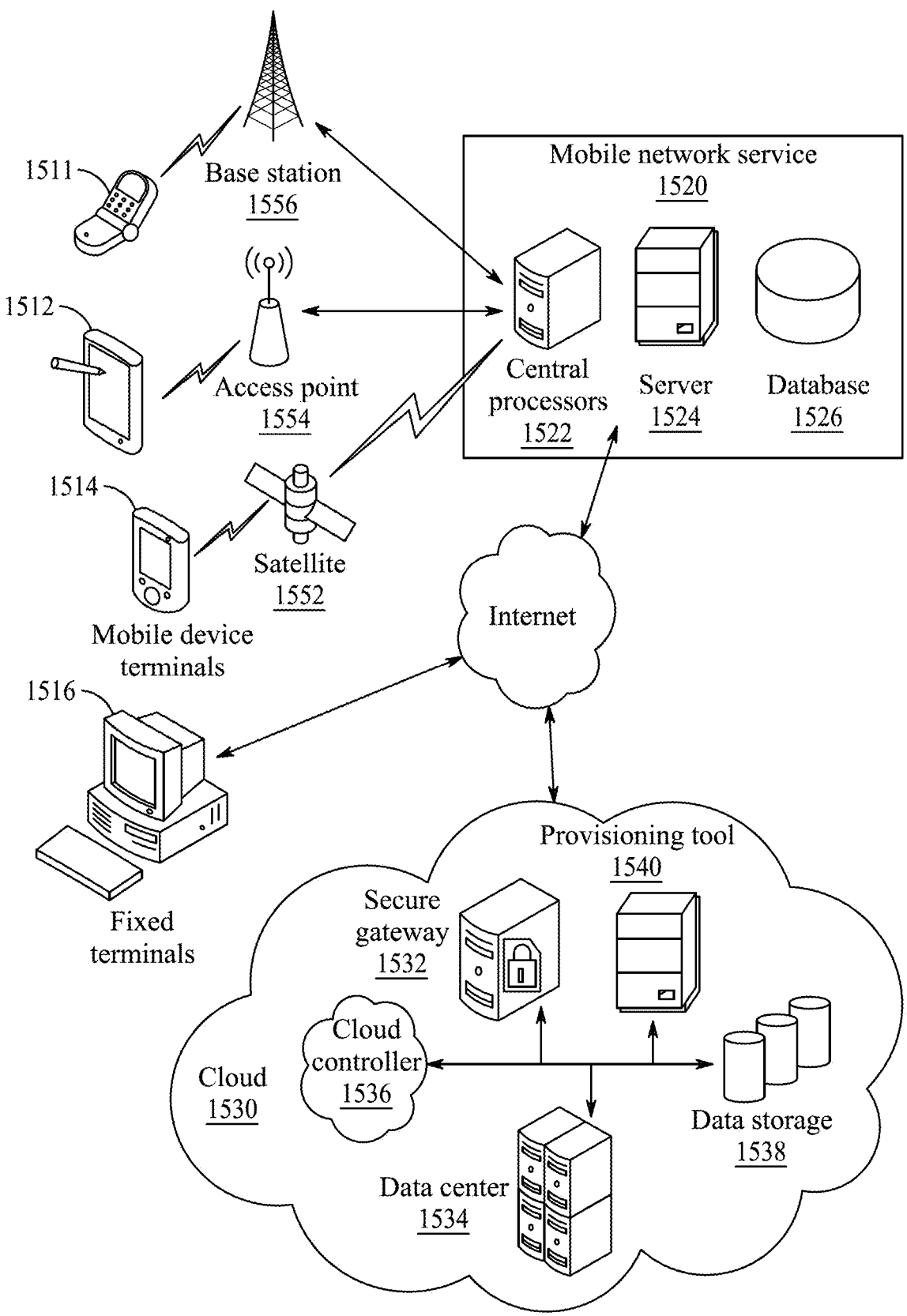
FIG. 15 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 1530 including a cloud controller 1536, a secure gateway 1532, a data center 1534, data storage 1538 and a provisioning tool 1540, and mobile network services 1520 including central processors 1522, a server 1524 and a database 1526, which may share processing, as shown by FIG. 15, in addition to various human interface and communication devices (e.g., display monitors 1516, smart phones 1510, tablets 1512, personal digital assistants (PDAs) 1514). The network may be a private network, such as a LAN, satellite 1552 or WAN 1554, or be a public network, may such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A fiber optic gyroscope system, comprising:
a broadband light source configured to transmit light waves;
a first 50/50 directional coupler connected at an input port to the broadband light source, wherein the first 50/50 directional coupler is configured to split the light waves into a first path and a second path;
a three port fiber circulator connected to the first 50/50 directional coupler, wherein the three port fiber circulator is configured to receive the light waves of the second path at a first port and emit the light waves of the second path from a second port;
a second 50/50 directional coupler connected to the second port of the three port fiber circulator, wherein the second 50/50 directional coupler is configured split the light waves of the second path into a third path and a fourth path;
an optical fiber coil connected to the second 50/50 directional coupler, wherein the optical fiber coil includes a plurality of loops configured to receive the light waves from the third path and the fourth path, circulate the light waves from the third path in a clockwise direction through the plurality of loops and circulate the light waves from the fourth path in a counterclockwise direction through the plurality of loops, wherein the light waves travelling in the counterclockwise direction are phase shifted with respect to the light waves travelling in the clockwise direction based on a rotational speed of the fiber optic gyroscope,
wherein the second 50/50 directional coupler is configured to recombine the light waves travelling in the clockwise direction and the light waves travelling in the counterclockwise direction and transmit a set of recombined phase shifted light waves to the second port of the three port fiber circulator,
wherein the three port fiber circulator is configured to emit a set of recombined phase shifted light waves from a third port, wherein the third port is connected to a feedback port of the first 50/50 directional coupler;
an optical spectrum analyzer connected to the first path of the first 50/50 directional coupler, wherein the optical spectrum analyzer is configured to receive the set of recombined phase shifted light waves from the first path, apply frequency domain interferometry to the set of recombined phase shifted light waves and generate an interferogram of the set of recombined phase shifted light waves;
a microprocessor including a circuitry, a memory storing program instructions and at least one processor configured to execute the program instructions to:
perform a Fast Fourier Transform of the interferogram to transform the interferogram into a set of frequency components having repeated patterns;
measure a spacing between two repeated patterns of frequency components; and
determine, from the measured spacing, an angular speed of the fiber optic gyroscope.

2. The fiber optic gyroscope system of claim 1, further comprising:
an optical amplifier located between the fiber circulator and the feedback port of the first 50/50 directional coupler, wherein the optical amplifier is configured to amplify the set of recombined phase shifted light waves.

3. The fiber optic gyroscope system of claim 2, wherein a gain of the optical amplifier is four.

4. The fiber optic gyroscope system of claim 2, wherein the first 50/50 directional coupler is configured to recirculate the recombined phase shifted light waves from the second path through a feedback path formed by the first port and the second port of the three port fiber circulator, the second 50/50 directional coupler, the optical fiber coil, a return path through the second 50/50 directional coupler, the second port and the third port of the three port fiber circulator, the optical amplifier and the feedback port of the first 50/50 directional coupler.

5. The fiber optic gyroscope system of claim 4, wherein the recirculation of the recombined phase shifted light waves through the feedback path is configured to increase the phase shift.

6. The fiber optic gyroscope system of claim 1, further comprising:
a Mach-Zehnder interferometer connected between the broadband beam source and the input port of the first 50/50 directional coupler, wherein the Mach-Zehnder interferometer is configured to generate an initial phase shift about a midpoint of a frequency of the light waves, wherein the microprocessor is configured to determine a direction of the angular rotation of the fiber optic gyroscope based on a direction of change in the frequency with respect to the midpoint of a dynamic range of the fiber optic gyroscope system.

7. The fiber optic gyroscope system of claim 6, wherein the Mach-Zehnder interferometer is configured with a first arm and a second arm, wherein the first arm includes a fiber stretcher configured to introduce the initial phase shift.

8. The fiber optic gyroscope system of claim 6, wherein the microprocessor is configured to determine that the direction of rotation of the fiber optic gyroscope is clockwise when the phase shift is greater than the initial phase shift and that the direction of rotation of the fiber optic gyroscope is counterclockwise when the phase shift is less than the initial phase shift.

9. The fiber optic gyroscope system of claim 1, wherein the optical fiber coil has a length of about two kilometers.

10. The fiber optic gyroscope system of claim 1, wherein the broadband light source is a super luminescent diode (SLED) source.

11. The fiber optic gyroscope system of claim 7, wherein the super luminescent diode (SLED) source has 3 dB linewidth of about 50 nm centered about 1550 nm.

12. The fiber optic gyroscope system of claim 1, wherein a measurement of the angular speed has a resolution of about 0.1°/sec.

13. A method for measuring a low speed angular rotation of a fiber optic gyroscope, comprising:
generating, with a broadband light source, a beam of light waves;
splitting, by a first 50/50 directional coupler, the beam of light waves into a first path and a second path;
transmitting, through a first port and a second port of a three port fiber circulator, the light waves of the second path to a second 50/50 directional coupler;
splitting, by the second 50/50 directional coupler, the light waves of the second path into a third path and a fourth path;
coupling the light waves of the third path into a first port of an optical fiber coil configured with a plurality of loops, wherein the light waves of the third path circulate in a clockwise direction within the plurality of loops;
coupling the light waves of the fourth path into a second port of the optical fiber coil, wherein the light waves of the fourth path circulate in a counterclockwise direction within the plurality of loops, wherein the light waves circulating in the counterclockwise direction phase shift with respect to the light waves travelling in the clockwise direction based on a rotational speed of the fiber optic gyroscope when the fiber optic gyroscope is rotating;
recombining, by the second 50/50 directional couple, the light waves circulating in the clockwise direction and the light waves circulating in the counterclockwise direction and transmitting the recombined phase shifted light waves to the second port of the three port fiber circulator;
emitting, from a third port of the three port fiber circulator the recombined phase shifted light waves;
receiving, by a feedback port of the first 50/50 directional coupler, the recombined phase shifted light waves;
receiving, by an optical spectrum analyzer, the recombined phase shifted light waves from the first path of the first 50/50 directional coupler;
generating, by the optical spectrum analyzer, an interferogram of the recombined phase shifted light waves;
receiving, by a microprocessor, the interferogram;
applying, by the microprocessor, a Fast Fourier Transform to the interferogram, wherein the Fast Fourier Transform is configured to transform the interferogram into a set of frequency components having repeated patterns;
measuring, by the microprocessor, a spacing between two repeated patterns of frequency components; and
determining, from the measured spacing, a speed of an angular rotation of the fiber optic gyroscope.

14. The method of claim 13, further comprising:
amplifying, by an amplifier connected between the third port of the three port fiber circulator and the feedback port of the first 50/50 directional coupler, the recombined phase shifted light waves.

15. The method of claim 14, further comprising:
increasing the phase shift by recirculating, from the second path of the first 50/50 directional coupler, the recombined phase shifted light waves through a feedback path formed by the first port and the second port of the three port fiber circulator, the second 50/50 directional coupler, the optical fiber coil, a return path through the second 50/50 directional coupler, the second port and the third port of the three port fiber circulator, the optical amplifier and the feedback port of the first 50/50 directional coupler.

16. The method of claim 13, further comprising;
generating an initial phase shift centered about a midpoint of a frequency of the light waves by connecting a Mach-Zehnder interferometer between the broadband light source and an input port of the first 50/50 directional coupler.

17. The method of claim 16, further comprising;
determining, by the microprocessor, a direction of the angular rotation of the fiber optic gyroscope based on a direction of change in the frequency with respect to the midpoint of a dynamic range of the fiber optic gyroscope.

18. The method of claim 17, further comprising:
determining, by the microprocessor, that the direction of rotation of the fiber optic gyroscope is clockwise when the phase shift is greater than the initial phase shift and that the direction of rotation of the fiber optic gyroscope is counterclockwise when the phase shift is less than the initial phase shift.

19. The method of claim 13, further comprising:
generating the broadband light waves by a super luminescent diode source having 3 dB linewidth of about 50 nm centered about 1550 nm.

20. The method of claim 13, wherein the optical fiber coil is configured to have a coil length of about two kilometers.

* * * * *